US011291980B2

United States Patent
Parvulescu et al.

(10) Patent No.: US 11,291,980 B2
(45) Date of Patent: *Apr. 5, 2022

(54) PROCESS FOR PREPARING AN EXTRUDABLE COMPOSITION COMPRISING A TITANIUM-CONTAINING ZEOLITIC MATERIAL, HAVING FRAMEWORK TYPE MWW

(71) Applicant: BASF SE, Ludwigshafen am Rhein (DE)

(72) Inventors: Andrei-Nicolae Parvulescu, Ludwigshafen am Rhein (DE); Ulrich Mueller, Ludwigshafen am Rhein (DE); Hans-Juergen Luetzel, Ludwigshafen am Rhein (DE); Georg Uhl, Ludwigshafen am Rhein (DE); Joaquim Henrique Teles, Ludwigshafen am Rhein (DE); Dominic Riedel, Ludwigshafen am Rhein (DE); Daniel Urbanczyk, Ludwigshafen am Rhein (DE); Ulrike Wegerle, Worms (DE); Markus Weber, Ludwigshafen am Rhein (DE); Nicolai Tonio Woerz, Ludwigshafen am Rhein (DE); Christian Mueller, Ludwigshafen am Rhein (DE)

(73) Assignee: BASF SE

( * ) Notice: Subject to any disclaimer, the term of this patent is extended or adjusted under 35 U.S.C. 154(b) by 4 days.

This patent is subject to a terminal disclaimer.

(21) Appl. No.: 16/461,134

(22) PCT Filed: Dec. 20, 2017

(86) PCT No.: PCT/EP2017/083806
§ 371 (c)(1),
(2) Date: May 15, 2019

(87) PCT Pub. No.: WO2018/115117
PCT Pub. Date: Jun. 28, 2018

(65) Prior Publication Data
US 2020/0070134 A1    Mar. 5, 2020

(30) Foreign Application Priority Data

Dec. 20, 2016    (EP) .................... 16205265

(51) Int. Cl.
*B01J 29/89*    (2006.01)
*B01J 35/10*    (2006.01)
*B01J 37/00*    (2006.01)
*C01B 37/00*    (2006.01)

(52) U.S. Cl.
CPC ........... *B01J 29/89* (2013.01); *B01J 35/1023* (2013.01); *B01J 37/0018* (2013.01); *C01B 37/005* (2013.01); *B01J 2229/186* (2013.01); *B01J 2229/37* (2013.01)

(58) Field of Classification Search
CPC ..................... B01J 29/7038; B01J 37/0009
See application file for complete search history.

(56) References Cited

U.S. PATENT DOCUMENTS

| 8,211,822 B2 * | 7/2012 | Mueller ............... C07D 301/12 502/242 |
| 2007/0099299 A1 | 5/2007 | Simon et al. |
| 2015/0368115 A1 * | 12/2015 | Parvulescu ............. C01B 39/48 423/706 |

FOREIGN PATENT DOCUMENTS

| CN | 105854933 A | 8/2016 | |
| RU | 2561100 C2 | 8/2015 | |
| WO | 2011/064191 A1 | 6/2011 | |
| WO | WO 2013/117536 A2 | 8/2013 | |
| WO | WO-2013117536 A2 * | 8/2013 | .............. B01J 29/89 |
| WO | 2014/060261 A1 | 4/2014 | |
| WO | 2016/038030 A1 | 3/2016 | |

OTHER PUBLICATIONS

International Search Report and Written Opinion dated May 8, 2018 in PCT/EP2017/083806 filed on Dec. 20, 2017.
International Preliminary Report on Patentability and Written Opinion dated Jul. 4, 2019, in PCT/EP2017/083806, 16 pages.

* cited by examiner

*Primary Examiner* — Colin W. Slifka
(74) *Attorney, Agent, or Firm* — Faegre Drinker Biddle & Reath LLP

(57) ABSTRACT

A process for preparing an extrudable composition comprising a titanium-containing zeolitic material having framework type MWW, the process comprising providing a titanium-containing zeolitic material having framework type MWW, having a water absorption capacity of at least 11 weight-%, subjecting the titanium-containing zeolitic material having framework type MWW an acid treatment, optionally incorporating zinc in the acid-treated titanium-containing zeolitic material having framework type MWW; preparing a composition comprising the titanium-containing zeolitic material having framework type MWW obtained from (ii) or (iii), a precursor of a silica binder, water, and a kneading agent, wherein the composition does not comprise a polyethylene oxide.

19 Claims, No Drawings

PROCESS FOR PREPARING AN EXTRUDABLE COMPOSITION COMPRISING A TITANIUM-CONTAINING ZEOLITIC MATERIAL, HAVING FRAMEWORK TYPE MWW

The present invention is directed to a process for preparing an extrudable composition which comprises a titanium-containing zeolitic material having framework type MWW, wherein said process comprises subjecting a titanium-containing zeolitic material having framework type MWW which exhibits a specific water absorption capacity, to an acid treatment. Further, among others, the present invention is directed to an extrudable composition, in particular an extrudable composition which is obtainable by the process of the present invention, and the use of said extrudable composition for preparing a molding.

ZnTiMWW catalysts, i.e. catalyst comprising a titanium-containing zeolitic material having framework type MWW which further comprises zinc, are known as excellent catalysts for the epoxidation of propene. Such catalysts are usually prepared in a synthesis process involving a shaping stage such as an extrusion step where moldings are prepared which are preferred for catalysts used in industrial-scale processes such as the above-mentioned epoxidation process. A process for preparing such catalysts is disclosed, for example, in WO 2013/117536 A1. In this document, it is disclosed that in order to prepare a composition which is subjected to extrusion, the use of polyethylene oxide as an additional compound of the composition to be extruded is not necessary if a ZnTiMWW zeolitic material is used which is prepared as disclosed in this document.

In view of this disclosure, the inventors of the present invention used a ZnTiMWW zeolitic material which was not prepared as disclosed in WO 2013/117536 A1. Surprisingly, it was found that in order to obtain an extrudable composition, an additional extrusion aid, for example polyethylene oxide, had to be employed. However, the less components to be used for preparing an extrudable composition, the more advantageous the preparation process is since, for example, additionally used compounds such as polyethylene oxide have to be removed from a catalyst molding after the shaping process, for example by calcination. Investigating further, the inventors of the present invention found out that the TiMWW zeolitic material disclosed in WO 2013/117536 A1 and being used for preparing the ZnTiMWW zeolitic material exhibits a water absorption capacity of less than 11 weight-% whereas other TiMWW zeolitic materials tested for the same use exhibit a water absorption capacity of at least 11 weight-%.

Therefore, it was an object of the present invention to provide a process for preparing an extrudable composition comprising a titanium-containing zeolitic material having framework type MWW and exhibiting a water absorption capacity of at least 11 weight-% wherein the extrudable composition to be used for preparing a molding contains as few components as possible. Surprisingly, it was found that such a process can be provided if the titanium-containing zeolitic material having framework type MWW and exhibiting a water absorption capacity of at least 11 weight-%, prior to being made a component of said composition, is suitably pretreated.

Therefore, the present invention relates to a process for preparing an extrudable composition comprising a titanium-containing zeolitic material having framework type MWW, the process comprising (i) providing a titanium-containing zeolitic material having framework type MWW, having a water absorption capacity of at least 11 weight-% as determined according to Reference Example 1 herein;

(ii) subjecting the titanium-containing zeolitic material having framework type MWW provided in (i) to an acid treatment, comprising (ii.1) preparing an aqueous suspension comprising an aqueous liquid phase and the titanium-containing zeolitic material having framework type MWW provided in (i), wherein the aqueous liquid phase comprises water and an acid;

(ii.2) heating the aqueous suspension according to (ii.1);

(ii.3) separating the acid-treated titanium-containing zeolitic material having framework type MWW from the liquid phase of the aqueous suspension according to (ii.2);

(iii) optionally incorporating zinc in the acid-treated titanium-containing zeolitic material having framework type MWW according to (ii);

(iv) preparing a composition comprising the titanium-containing zeolitic material having framework type MWW obtained from (ii) or (iii), a precursor of a silica binder, water, and a kneading agent, wherein the composition does not comprise a polyethylene oxide.

The parameter "water absorption capacity" as used in the context of the present invention is defined as being determined by the water uptake measurement as described in detail in Reference Example 1 herein.

Step (i)

Preferably, the titanium-containing zeolitic material having framework type MWW provided in (i) has a water absorption capacity in the range of from 11 to 20 weight-%, more preferably in the range of from 11 to 19 weight-%, more preferably in the range of from 11.5 to 18 weight-%, more preferably in the range of from 12 to 16 weight-%. Preferred ranges are, for example, from 12 to 14 weight-% or from 13 to 15 weight-% or from 14 to 16 weight-%.

With regard to the chemical composition of the titanium-containing zeolitic material having framework type MWW provided in (i), it is preferred that the zeolitic framework is substantially free of aluminum and essentially consists of silicon, oxygen, titanium and hydrogen. Optionally, the zeolitic framework may contain a certain amount of boron which may be present due to the specific method according to which the zeolitic material is prepared. Preferably, at least 99 weight-%, more preferably at least 99.5 weight-%, of the zeolitic framework of the titanium-containing zeolitic material having framework type MWW provided in (i) consist of Ti, Si, O, and H. More preferably, at least 99 weight-%, more preferably at least 99.5 weight-%, of the zeolitic material having framework type MWW provided in (i) consist of Ti, Si, O, and H.

Preferably, the titanium-containing zeolitic material having framework type MWW provided in (i) comprises titanium, calculated as elemental titanium, in an amount in the range of from 0.1 to 5 weight-%, more preferably in the range of from 0.5 to 4 weight-%, more preferably in the range of from 1 to 3 weight-%, based on the total weight of the titanium-containing zeolitic material having framework type MWW. Preferred ranges are, for example, from 1 to 2 weight-% or from 1.5 to 2.5 weight-% or from 2 to 3 weight-%.

Preferably, the titanium-containing zeolitic material having framework type MWW provided in (i) is a calcined titanium-containing zeolitic material having framework type MWW.

Preferably, the titanium-containing zeolitic material having framework type MWW comprises, preferably consists of particles exhibiting a specific particle size distribution which is preferably characterized by a Dv10 value in the range of from 1 to 5 micrometer, preferably in the range of from 2 to 4 micrometer, more preferably in the range of from 2 to 3 micrometer, a Dv50 value in the range of from 7 to 15 micrometer, preferably in the range of from 8 to 12 micrometer, more preferably in the range of from 8 to 11 micrometer, and a Dv90 value in the range of from 20 to 40 micrometer, preferably in the range of from 25 to 35 micrometer, more preferably in the range of from 26 to 32 micrometer, as determined according to Reference Example 7 herein.

Step (ii)

According to (ii), the the titanium-containing zeolitic material having framework type MWW provided in (i) is subjected to an acid treatment.

Preferably, in the aqueous suspension prepared in (ii.1), the weight ratio of the aqueous liquid phase relative to the titanium-containing zeolitic material having framework type MWW is in the range of from 10:1 to 30:1, preferably in the range of from 15:1 to 25:1, more preferably in the range of from 18:1 to 22:1.

The acid which is comprised in the aqueous liquid phase preferably comprises, more preferably is, one or more inorganic acids, preferably one or more of phosphoric acid, sulphuric acid, hydrochloric acid, and nitric acid. More preferably, the acid comprises sulphuric acid or nitric acid. More preferably, the acid is sulphuric acid or nitric acid. Preferably, the acid is at least partially, more preferably completely, dissolved in the water comprised in the aqueous liquid phase.

Generally, it is conceivable that the aqueous liquid phase according to (ii.1) comprises, in addition to the water and the acid, one or more further suitable compounds. Preferably, the liquid phase essentially consists of the acid and the water. More preferably, at least 99 weight-%, more preferably at least 99.5 weight-%, more preferably at least 99.9 weight-% of the aqueous liquid phase according to (ii.1) consist of water and the acid.

The pH of the aqueous liquid phase according to (ii.1), determined as described in Reference Example 2 herein, is preferably in the range of from 0 to 5, more preferably in the range of from 0 to 3, more preferably in the range of from 0 to 4, more preferably in the range of from 0 to 2.

Generally, it is conceivable that the aqueous suspension prepared in (ii.1) comprises, in addition to the water, the acid and the titanium-containing zeolitic material having framework type MWW, one or more further suitable compounds. Preferably, the aqueous suspension essentially consists of the water, the acid and the titanium-containing zeolitic material having framework type MWW. More preferably, at least 99 weight-%, more preferably at least 99.5 weight-%, more preferably at least 99.9 weight-% of the aqueous suspension prepared in (ii.1) consist of the aqueous liquid phase and the titanium-containing zeolitic material having framework type MWW.

Regarding (ii.2), it is preferred that the aqueous suspension according to (ii.1) is heated to a temperature of the suspension in the range of from 50 to 175° C., more preferably in the range of from 70 to 125° C., more preferably in the range of from 90 to 105° C. Preferred ranges are, for example, from 90 to 100 or from 95 to 105° C. According to (ii.2), the aqueous suspension can be kept at that temperature or different temperatures in the above-defined preferred ranges, for every suitable period of time. Preferably, the aqueous suspension is kept at said temperature for 0.1 to 24 h, more preferably for 0.3 to 6 h, more preferably for 0.5 to 1.5 h. It is possible that the heating according to (ii.2) is carried out in a closed system under autogenous pressure, preferably in an autoclave. It is further possible that heating the suspension and keeping the suspension at said temperature is carried out in a closed system under autogenous pressure, preferably in an autoclave. It is possible that during heating and/or during keeping the suspension at said temperature, the suspension is mechanically agitated, preferably stirred. After keeping the suspension at said temperature, the suspension is preferably cooled, preferably to a temperature of at most 50° C., for example to room temperature.

According to (ii.3), the acid-treated titanium-containing zeolitic material having framework type MWW is suitably separated from the liquid phase of the suspension. For this solid-liquid separation, every conceivable method or combination of two or more methods can be employed. Preferably, in (ii.3), the separating of the acid-treated titanium-containing zeolitic material having framework type MWW from the liquid phase of the aqueous suspension according to (ii.2) includes one or more of filtrating and centrifuging. Preferably, in (ii.3), the separating of the acid-treated titanium-containing zeolitic material having framework type MWW from the liquid phase of the aqueous suspension according to (ii.2) further includes drying the acid-treated titanium-containing zeolitic material having framework type MWW wherein the drying is preferably carried out in at a gas atmosphere at a temperature of the gas atmosphere preferably in the range of from 100 to 250° C., more preferably in the range of from 110 to 200° C., more preferably in the range of from 120 to 160° C. Every suitable gas atmosphere can be used wherein a preferred gas atmosphere comprises nitrogen. Therefore, a preferred gas atmosphere is air, lean air, or nitrogen such as technical nitrogen. Instead of filtrating and subsequent drying the filter cake, it may be preferred to subject the aqueous suspension to rapid-drying wherein prior to rapid-drying, the aqueous suspension can be either diluted or concentrated. Preferably, the separating of the acid-treated titanium-containing zeolitic material having framework type MWW according to (ii.3) from the liquid phase of the aqueous suspension according to (ii.2) using rapid-drying includes one or more of spray-drying, flash-drying, and microwave drying.

According to the present invention, it is preferred that the acid-treated titanium-containing zeolitic material having framework type MWW, preferably after separation from the liquid phase of the aqueous suspension according to (ii.2), more preferably after drying, is suitably calcined. Preferably, the acid-treated titanium-containing zeolitic material having framework type MWW is calcined in a gas atmosphere at a temperature of the gas atmosphere in the range of from 400 to 800° C., preferably in the range of from 500 to 750° C., more preferably in the range of from 600 to 700° C. Every suitable gas atmosphere can be used wherein a preferred gas atmosphere comprises nitrogen. Therefore, a preferred gas atmosphere is air, lean air, or nitrogen such as technical nitrogen.

Step (iii)

According to (iii), zinc is optionally incorporated in the acid-treated titanium-containing zeolitic material having framework type MWW according to (ii). Therefore, according to a first embodiment of the present invention, no zinc is incorporated in the acid-treated titanium-containing zeolitic material having framework type MWW according to (ii) prior to (iv). According to a second and preferred embodiment of the present invention, it is preferred that according to (iii), zinc is incorporated in the acid-treated titanium-containing zeolitic material having framework type MWW according to (ii). Therefore, the present invention preferably relates to a process for preparing an extrudable composition comprising a titanium-containing zeolitic material having framework type MWW, the process comprising (i) providing a titanium-containing zeolitic material having framework type MWW, having a water absorption capacity of at least 11 weight-% as determined according to Reference Example 1 herein;

(ii) subjecting the titanium-containing zeolitic material having framework type MWW provided in (i) to an acid treatment, comprising
   (ii.1) preparing an aqueous suspension comprising an aqueous liquid phase and the titanium-containing zeolitic material having framework type MWW provided in (i), wherein the aqueous liquid phase comprises water and an acid;
   (ii.2) heating the aqueous suspension according to (ii.1);
   (ii.3) separating the acid-treated titanium-containing zeolitic material having framework type MWW from the liquid phase of the aqueous suspension according to (ii.2);

(iii) incorporating zinc in the acid-treated titanium-containing zeolitic material having framework type MWW according to (ii);

(iv) preparing a composition comprising the titanium-containing zeolitic material having framework type MWW obtained from (iii), a precursor of a silica binder, water, and a kneading agent, wherein the composition does not comprise a polyethylene oxide.

According to the above-discussed two embodiments, the term titanium-containing zeolitic material having framework type MWW used according to (iv) either relates to a titanium-containing zeolitic material having framework type MWW in which no zinc has been incorporated according to (iii), or relates to a titanium-containing zeolitic material having framework type MWW in which zinc has been incorporated according to (iii).

Regarding the incorporation of zinc according to (iii), no specific restrictions exist. Preferably, the incorporation of zinc comprises an impregnation, more preferably a wet impregnation, of the acid-treated titanium-containing zeolitic material having framework type MWW. Regarding the preferred wet impregnation, it is further preferred that it comprises
   (iii.1) preparing an aqueous suspension comprising an aqueous liquid phase and the acid-treated titanium-containing zeolitic material having framework type MWW, wherein the aqueous liquid phase comprises water and a dissolved zinc salt;
   (iii.2) heating the aqueous suspension according to (iii.1);
   (iii.3) separating the acid-treated titanium-containing zeolitic material having framework type MWW and comprising zinc from the liquid phase of the aqueous suspension according to (iii.2).

In the aqueous suspension prepared in (iii.1), the weight ratio of the aqueous liquid phase relative to the acid-treated titanium-containing zeolitic material having framework type MWW is preferably in the range of from 40:1 to 1:1, more preferably in the range of from 35:1 to 5:1, more preferably in the range of from 15:1 to 6:1.

Any suitably zinc salt can be employed. Preferably, the zinc salt comprises zinc acetate, preferably zinc acetate dihydrate. More preferably, the zinc salt is zinc acetate, preferably zinc acetate dihydrate.

In the aqueous suspension according to (iii.1), the weight ratio of the dissolved zinc salt, calculated as elemental zinc, relative to the acid-treated titanium-containing zeolitic material having framework type MWW is preferably in the range of from 0.01:1 to 0.2:1, more preferably in the range of from 0.02:1 to 0.1:1, more preferably in the range of from 0.04:1 to 0.06:1.

Generally, it is conceivable that the aqueous liquid phase according to (iii.1) comprises, in addition to the water and the dissolved zinc salt, one or more further compounds. Preferably, the aqueous liquid phase according to (iii.1) essentially consists of the water and the dissolved zinc salt. More preferably, at least 99 weight-%, more preferably at least 99.5 weight-%, more preferably at least 99.9 weight-% of the aqueous liquid phase according to (iii.1) consist of water and the dissolved zinc salt.

Generally, it is conceivable that the aqueous suspension prepared in (iii.1) comprises, in addition to the water and the dissolved zinc salt, one or more further compounds. Preferably, the aqueous suspension prepared in (iii.1) essentially consists of the water and the dissolved zinc salt. More preferably, at least 99 weight-%, more preferably at least 99.5 weight-%, more preferably at least 99.9 weight-% of the aqueous suspension prepared in (iii.1) consist of the aqueous liquid phase and acid-treated the titanium-containing zeolitic material having framework type MWW.

Regarding (iii.2), it is preferred that aqueous suspension according to (iii.1) is heated to a temperature of the suspension in the range of from 65 to 135° C., more preferably in the range of from 75 to 125° C., more preferably in the range of from 85 to 115° C. Preferred ranges are, for example, from 85 to 95° C. or from 90 to 100° C. or from 95 to 105° C. According to (iii.2), the aqueous suspension can be kept at that temperature or different temperatures in the above-defined preferred ranges, for every suitable period of time. Preferably, the aqueous suspension is kept at said temperature for 0.2 to 10 h, more preferably for 0.5 to 8 h, more preferably for 1 to 6 h.

According to (iii.3), the acid-treated titanium-containing zeolitic material having framework type MWW and comprising zinc is suitably separated from the liquid phase of the suspension. For this solid-liquid separation, every conceivable method or combination of two or more methods can be employed. Preferably, in (iii.3), the separating of the acid-treated titanium-containing zeolitic material having framework type MWW and comprising zinc from the liquid phase of the aqueous suspension according to (iii.2) includes one or more of filtrating and centrifuging. Preferably, in (iii.3), the separating of the acid-treated titanium-containing zeolitic material having framework type MWW and comprising zinc from the liquid phase of the aqueous suspension according to (iii.2) further includes drying the acid-treated titanium-containing zeolitic material having framework type MWW wherein the drying is preferably carried out in at a gas atmosphere at a temperature of the gas atmosphere preferably in the range of from 100 to 300° C., more preferably in the range of from 150 to 275° C., more preferably in the range of from 200 to 250° C. Every suitable gas atmosphere can be used wherein a preferred gas atmosphere comprises nitrogen. Therefore, a preferred gas atmosphere is air, lean air, or nitrogen such as technical nitrogen. Instead of filtrating and subsequent drying the filter cake, it may be preferred to subject the aqueous suspension to rapid-drying wherein prior to rapid-drying, the aqueous suspension can be either diluted or concentrated. Preferably, the separating of the acid-treated titanium-containing zeolitic material having framework type MWW and comprising zinc according to (iii.3) from the liquid phase of the aqueous suspension according to (iii.2) using rapid-drying includes one or more of spray-drying, flash-drying, and microwave drying.

According to the present invention, it is preferred that the acid-treated titanium-containing zeolitic material having framework type MWW and comprising zinc, preferably after separation from the liquid phase of the aqueous suspension according to (iii.2), more preferably after drying, is suitably calcined. Preferably, the acid-treated titanium-containing zeolitic material having framework type MWW and comprising zinc is calcined in a gas atmosphere at a temperature of the gas atmosphere in the range of from 500 to 725° C., preferably in the range of from 600 to 700° C., more preferably in the range of from 625 to 675° C. Every suitable gas atmosphere can be used wherein a preferred gas atmosphere comprises nitrogen. Therefore, a preferred gas atmosphere is air, lean air, or nitrogen such as technical nitrogen.

Step (iv)

According to (iv), a composition is prepared which comprises the titanium-containing zeolitic material having framework type MWW obtained from (ii) or (iii), preferably from (iii), a precursor of a silica binder, water, and a kneading agent, wherein the composition does not comprise a polyethylene oxide.

Preferably, any suitable kneading agent can be employed. Preferably, the kneading agent comprised in the composition according to (iv) comprises, preferably is, one or more hydrophilic polymer, more preferably comprises, more preferably is, one or more carbohydrates, more preferably comprises, more preferably is, one or more of a cellulose and a cellulose derivative, more preferably comprises, more preferably is, one or more of a cellulose, a cellulose ether and a cellulose ester. More preferably, the kneading agent comprised in the composition according to (iv) comprises, preferably is, a cellulose ether, preferably a cellulose alkyl ether, more preferably a methyl cellulose. More preferably, the kneading agent comprised in the composition according to (iv) consists of a methyl cellulose. In the composition according to (iv), the weight ratio of the titanium-containing zeolitic material having framework type MWW relative to the kneading agent is in the range of from 5:1 to 20:1, preferably in the range of from 8:1 to 18:1, more preferably in the range of from 9:1 to 16:1.

Regarding the precursor of the silica binder, it is generally possible to use both colloidal silica and so-called "wet process" silica and so-called "dry process" silica. Particularly preferably this silica is amorphous silica, the size of the silica particles being, for example, in the range of from 1 to 100 nm and the surface area of the silica particles being in the range of from 50 to 500 m²/g. Colloidal silica, preferably as an alkaline and/or ammoniacal solution, more preferably as an ammoniacal solution, is commercially available, inter alia, for example as Ludox®, Syton®, Nalco®, Snowtex®. "Wet process" silica is commercially available, inter alia, for example as HiSil®, Ultrasil®, Vulcasil®, Santocel®, ValronEstersil®, Tokusil® or Nipsil®. "Dry process" silica is commercially available, inter alia, for example as Aerosil®, Reolosil®, Cab-O-Sil®, Fransil® or ArcSilica®. Inter alia, an ammoniacal solution of colloidal silica is preferred in the present invention. Preferably according to the present invention, the precursor of the silica binder comprised in the composition according to (iv) comprises, more preferably is, one or more of a silica gel, a precipitated silica, a fumed silica, and a colloidal silica. More preferably, the precursor of the silica binder comprised in the composition according to (iv) comprises, preferably is, a colloidal silica. More preferably, the precursor of the silica binder comprised in the composition according to (iv) consists of a colloidal silica. In the composition according to (iv), the weight ratio of the titanium-containing zeolitic material having framework type MWW relative to the precursor of the silica binder, calculated as $SiO_2$, is preferably in the range of from 1:1 to 10:1, more preferably in the range of from 3:1 to 7:1, more preferably in the range of from 3.5:1 to 4.5:1.

According to the present invention, the composition according to (iv) does not comprise a polyethylene oxide having a mean molecular weight MW (g/mol) of about 4,000,000, preferably does not comprise a polyethylene oxide having a mean molecular weight MW (g/mol) in the range of from 100,000 to 6,000,000, more preferably does not comprise a polyethylene oxide. Preferably, the composition according to (iv) does not comprise a polyalkylene oxide, more preferably does not comprise one or more of a polyalkylene oxides, a polystyrene, a polyacrylate, a polymethacrylate, a polyolefin, a polyamide, and a polyester. Therefore, the present invention preferably relates to a process for preparing an extrudable composition comprising a titanium-containing zeolitic material having framework type MWW, the process comprising (i) providing a titanium-containing zeolitic material having framework type MWW, having a water absorption capacity of at least 11 weight-% as determined according to Reference Example 1 herein;

(ii) subjecting the titanium-containing zeolitic material having framework type MWW provided in (i) to an acid treatment, comprising (ii.1) preparing an aqueous suspension comprising an aqueous liquid phase and the titanium-containing zeolitic material having framework type MWW provided in (i), wherein the aqueous liquid phase comprises water and an acid;

(ii.2) heating the aqueous suspension according to (ii.1);

(ii.3) separating the acid-treated titanium-containing zeolitic material having framework type MWW from the liquid phase of the aqueous suspension according to (ii.2);

(iii) incorporating zinc in the acid-treated titanium-containing zeolitic material having framework type MWW according to (ii);

(iv) preparing a composition comprising the titanium-containing zeolitic material having framework type MWW obtained from (iii), a precursor of a silica binder, water, and a kneading agent, wherein the composition does not comprise one or more of a polyalkylene oxides, a polystyrene, a polyacrylate, a polymethacrylate, a polyolefin, a polyamide, and a polyester, preferably does not comprise a polyalkylene oxides, a polystyrene, a polyacrylate, a polymethacrylate, a polyolefin, a polyamide, and a polyester.

Preferably, from 60 to 75 weight-%, more preferably from 63 to 72 weight-%, more preferably from 65 to 70 weight-% of the composition according to (iv) consist of water. At least a portion of the water comprised in the composition according to (iv) may be an ammonia-stabilized water.

More preferably, at least 99 weight-%, preferably at least 99.5 weight-%, more preferably at least 99.9 weight-% of the composition according to (iv) consist of the titanium-containing zeolitic material having framework type MWW obtained from (iii), the precursor of the silica binder, the water, and the kneading agent. Therefore, the composition according to (iv) does not comprise a polyethylene oxide. Preferably, the composition according to (iv) does not comprise a polyalkylene oxide, more preferably does not comprise one or more of a polyalkylene oxides, a polystyrene, a polyacrylate, a polymethacrylate, a polyolefin, a polyamide, and a polyester. Therefore, the present invention preferably relates to a process for preparing an extrudable composition comprising a titanium-containing zeolitic material having framework type MWW, the process comprising
- (i) providing a titanium-containing zeolitic material having framework type MWW, having a water absorption capacity of at least 11 weight-% as determined according to Reference Example 1 herein;
- (ii) subjecting the titanium-containing zeolitic material having framework type MWW provided in (i) to an acid treatment, comprising
  - (ii.1) preparing an aqueous suspension comprising an aqueous liquid phase and the titanium-containing zeolitic material having framework type MWW provided in (i), wherein the aqueous liquid phase comprises water and an acid;
  - (ii.2) heating the aqueous suspension according to (ii.1);
  - (ii.3) separating the acid-treated titanium-containing zeolitic material having framework type MWW from the liquid phase of the aqueous suspension according to (ii.2);
- (iii) incorporating zinc in the acid-treated titanium-containing zeolitic material having framework type MWW according to (ii);
- (iv) preparing a composition comprising the titanium-containing zeolitic material having framework type MWW obtained from (iii), a precursor of a silica binder preferably consisting of a colloidal silica, water, and a kneading agent preferably consisting of a methyl cellulose, wherein the composition does not comprise one or more of a polyalkylene oxides, a polystyrene, a polyacrylate, a polymethacrylate, a polyolefin, a polyamide, and a polyester, preferably does not comprise a polyalkylene oxides, a polystyrene, a polyacrylate, a polymethacrylate, a polyolefin, a polyamide, and a polyester, wherein at least 99 weight-%, preferably at least 99.5 weight-%, more preferably at least 99.9 weight-%, more preferably at least 99.99 weight-% of the composition according to (iv) consist of the titanium-containing zeolitic material having framework type MWW obtained from (iii), the precursor of the silica binder, the water, and the kneading agent.

Preferably, the composition according to (iv), i.e. the extrudable composition according to the present invention, has a plasticity of at most 1,500 N as determined according to Reference Example 3 herein. More preferably, the composition according to (iv) has a plasticity in the range of from 400 to 1,250 N. More preferably, the composition according to (iv) has a plasticity in the range of from 450 to 1,000 N.

No specific restrictions exist how the composition according to (iv) is prepared. Preferably, preparing the composition comprises mechanically agitating, preferably kneading the composition, preferably until the individual components of the composition which were added in a suitable sequence together form a homogenous mass.

Step (v)

Preferably, after step (iv), the extrudable composition obtained from (iv) is subjected to extrusion, and from said extrusion, a molding is obtained. Thus, preferably, after (iv) and prior to (v), the composition obtained from (iv) is not changed in its composition. Therefore, the present invention also relates to the process as described above, which process further comprises
- (v) extruding the composition according to (iv), obtaining a molding.

Therefore, the present invention also relates to a process for preparing a molding comprising a titanium-containing zeolitic material having framework type MWW, the process comprising
- (i) providing a titanium-containing zeolitic material having framework type MWW, having a water absorption capacity of at least 11 weight-% as determined according to Reference Example 1 herein;
- (ii) subjecting the titanium-containing zeolitic material having framework type MWW provided in (i) to an acid treatment, comprising
  - (ii.1) preparing an aqueous suspension comprising an aqueous liquid phase and the titanium-containing zeolitic material having framework type MWW provided in (i), wherein the aqueous liquid phase comprises water and an acid;
  - (ii.2) heating the aqueous suspension according to (ii.1);
  - (ii.3) separating the acid-treated titanium-containing zeolitic material having framework type MWW from the liquid phase of the aqueous suspension according to (ii.2);
- (iii) optionally incorporating zinc in the acid-treated titanium-containing zeolitic material having framework type MWW according to (ii);
- (iv) preparing a composition comprising the titanium-containing zeolitic material having framework type MWW obtained from (ii) or (iii), a precursor of a silica binder, water, and a kneading agent, wherein the composition does not comprise a polyethylene oxide;
- (v) extruding the composition according to (iv), obtaining a molding.

Preferably, the present invention relates to a process for preparing a molding comprising a titanium-containing zeolitic material having framework type MWW, the process comprising
- (i) providing a titanium-containing zeolitic material having framework type MWW, having a water absorption capacity of at least 11 weight-% as determined according to Reference Example 1 herein;
- (ii) subjecting the titanium-containing zeolitic material having framework type MWW provided in (i) to an acid treatment, comprising
  - (ii.1) preparing an aqueous suspension comprising an aqueous liquid phase and the titanium-containing zeolitic material having framework type MWW provided in (i), wherein the aqueous liquid phase comprises water and an acid;
  - (ii.2) heating the aqueous suspension according to (ii.1);
  - (ii.3) separating the acid-treated titanium-containing zeolitic material having framework type MWW from the liquid phase of the aqueous suspension according to (ii.2);
- (iii) incorporating zinc in the acid-treated titanium-containing zeolitic material having framework type MWW according to (ii);
- (iv) preparing a composition comprising the titanium-containing zeolitic material having framework type MWW obtained from (iii), a precursor of a silica binder preferably consisting of a colloidal silica, water, and a kneading agent preferably consisting of a methyl cellulose, wherein the composition does not comprise one or more of a polyalkylene oxides, a polystyrene, a polyacrylate, a polymethacrylate, a polyolefin, a polyamide, and a polyester, preferably does not comprise a polyalkylene oxides, a polystyrene, a polyacrylate, a polymethacrylate, a polyolefin, a polyamide, and a polyester, wherein at least 99 weight-%, preferably at least 99.5 weight-%, more preferably at least 99.9 weight-%, more preferably at least 99.99 weight-% of the composition according to (iv) consist of the titanium-containing zeolitic material having framework type MWW obtained from (iii), the precursor of the silica binder, the water, and the kneading agent;

(v) extruding the composition according to (iv), obtaining a molding.

Regarding the extruding according to (v), no specific restrictions exist. Generally, every method of extruding the composition obtained from (iv) can be employed. The term "extrusion" as used herein relates to a method from which moldings having an essentially fixed cross-sectional profile are obtained wherein the composition obtained from (iv) is suitably pushed through a suitable die which exhibits the desired cross-section. The molding which is obtained from the extruder used can be cut downstream of the respectively used die, for example using a suitable air stream and/or a mechanical cutting device such as a suitable wire. If it is not necessary to obtain moldings having essentially identical length, it is also possible that the molding obtained from the extruder is not cut but breaks under its own weight downstream of the die leading to moldings having different lengths. The cross-section of the molding can be, for example, circle-shaped, oval, star-shaped, and the like. Preferably, according to the present invention, the molding has a circle-shaped cross-section wherein the diameter is preferably in the range of from 0.5 to 2.5 mm, more preferably in the range of from 1 to 2 mm.

Preferably, the molding comprising of the titanium-containing zeolitic material having framework type MWW is subjected to drying in a step (vi) wherein the drying is preferably carried out in at a gas atmosphere at a temperature of the gas atmosphere preferably in the range of from 50 to 200° C., more preferably in the range of from 75 to 175° C., more preferably in the range of from 100 to 150° C. Every suitable gas atmosphere can be used wherein a preferred gas atmosphere comprises nitrogen. Therefore, a preferred gas atmosphere is air, lean air, or nitrogen such as technical nitrogen.

Preferably, the preferably dried molding comprising of the titanium-containing zeolitic material having framework type MWW is subjected to calcination in a step (vii) wherein the calcination is preferably carried out in at a gas atmosphere at a temperature of the gas atmosphere preferably in the range of from 400 to 700° C., more preferably in the range of from 450 to 650° C., more preferably in the range of from 500 to 600° C. Every suitable gas atmosphere can be used wherein a preferred gas atmosphere comprises nitrogen. Therefore, a preferred gas atmosphere is air, lean air, or nitrogen such as technical nitrogen.

Therefore, the present invention preferably relates to a process for preparing a molding comprising a titanium-containing zeolitic material having framework type MWW, the process comprising (i) providing a titanium-containing zeolitic material having framework type MWW, having a water absorption capacity of at least 11 weight-% as determined according to Reference Example 1 herein;

(ii) subjecting the titanium-containing zeolitic material having framework type MWW provided in (i) to an acid treatment, comprising (ii.1) preparing an aqueous suspension comprising an aqueous liquid phase and the titanium-containing zeolitic material having framework type MWW provided in (i), wherein the aqueous liquid phase comprises water and an acid;

(ii.2) heating the aqueous suspension according to (ii.1);

(ii.3) separating the acid-treated titanium-containing zeolitic material having framework type MWW from the liquid phase of the aqueous suspension according to (ii.2);

(iii) incorporating zinc in the acid-treated titanium-containing zeolitic material having framework type MWW according to (ii);

(iv) preparing a composition comprising the titanium-containing zeolitic material having framework type MWW obtained from (iii), a precursor of a silica binder preferably consisting of a colloidal silica, water, and a kneading agent preferably consisting of a methyl cellulose, wherein the composition does not comprise one or more of a polyalkylene oxides, a polystyrene, a polyacrylate, a polymethacrylate, a polyolefin, a polyamide, and a polyester, preferably does not comprise a polyalkylene oxides, a polystyrene, a polyacrylate, a polymethacrylate, a polyolefin, a polyamide, and a polyester, wherein at least 99 weight-%, preferably at least 99.5 weight-%, more preferably at least 99.9 weight-%, more preferably at least 99.99 weight-% of the composition according to (iv) consist of the titanium-containing zeolitic material having framework type MWW obtained from (iii), the precursor of the silica binder, the water, and the kneading agent;

(v) extruding the composition according to (iv), obtaining a molding;

(vi) drying the molding in a gas atmosphere at a temperature of the gas atmosphere in the range of from 50 to 200° C., preferably in the range of from 75 to 175° C., more preferably in the range of from 100 to 150° C.;

(vii) calcining the dried molding in a gas atmosphere at a temperature of the gas atmosphere in the range of from 400 to 700° C., preferably in the range of from 450 to 650° C., more preferably in the range of from 500 to 600° C.

The Extrudable Composition

The present invention also relates to an extrudable composition which is obtainable or obtained by a process as described above, in particular a process comprising steps (i) to (iv). Further, the present invention relates to an extrudable composition which comprises a titanium-containing zeolitic material having framework type MWW which, preferably, additional comprises zinc, a precursor of a silica binder, water, and a kneading agent, wherein said composition does not comprise polyethylene oxide and wherein at least 99 weight-% of the composition consist of the titanium-containing zeolitic material having framework type MWW, the precursor of a silica binder, the water, and the kneading agent, said composition having a plasticity of at most 1,500 N as determined according to Reference Example 3 herein. Preferably, the extrudable composition has a plasticity in the range of from 400 to 1,250 N, preferably in the range of from 450 to 1,000 N. With regard to the preferred precursor of a silica binder and the preferred kneading agent, reference is made to the respective disclosure in the process section and the embodiment section hereinunder.

Therefore, the present invention preferably relates to an extrudable composition comprising a colloidal silica as the silica sources, a methyl cellulose as the kneading agent, and a titanium-containing zeolitic material having framework type MWW preferably comprising zinc, wherein in the extrudable composition, the weight ratio of the titanium-containing zeolitic material having framework type MWW preferably comprising zinc relative to the kneading agent is in the range of from 5:1 to 20:1, preferably in the range of from 8:1 to 18:1, more preferably in the range of from 9:1 to 16:1, the weight ratio of the titanium-containing zeolitic material having framework type MWW preferably comprising zinc relative to the precursor of the silica binder, calculated as $SiO_2$, is in the range of from 1:1 to 10:1, preferably in the range of from 3:1 to 7:1, more preferably in the range of from 3.5:1 to 4.5:1, and wherein the extrudable composition does not comprise a polyalkylene oxide, preferably does not comprise one or more of a polyalkylene oxides, a polystyrene, a polyacrylate, a polymethacrylate, a polyolefin, a polyamide, and a polyester, more preferably does not comprise a polyalkylene oxides, a polystrene, a polyacrylate, a polymethacrylate, a polyolefin, a polyamide, and a polyester, wherein from 60 to 75 weight-%, preferably from 63 to 72 weight-%, more preferably from 65 to 70 weight-% of the extrudable composition consist of water and wherein at least 99.5 weight-%, preferably at least 99.9 weight-% of the extrudable composition consist of the titanium-containing zeolitic material having framework type MWW preferably comprising zinc, the precursor of the silica binder, the water, and the kneading agent.

Preferably, the titanium-containing zeolitic material having framework type MWW preferably comprising zinc is an acid-treated titanium-containing zeolitic material having framework type MWW, said acid-treated titanium-containing zeolitic material having framework type MWW preferably being obtainable of obtained by a process comprising, preferably consisting of steps (i) and (ii) and preferably (iii) of a process as disclosed hereinabove. Regarding preferred titanium-containing zeolites having framework type MWW, reference is made to the respective disclosure in the process section and the embodiment section hereinunder.

The Molding

Yet further, the present invention relates to a molding which is obtainable or obtained by a process as described above, preferably a process comprising steps (i) to (v), more preferably a process comprising steps (i) to (vi), more preferably comprising steps (i) to (vii).

Further, the present invention relates to a molding comprising a titanium-containing zeolitic material having framework type MWW preferably comprising zinc and a silica binder, wherein at least 99 weight-% of the molding consist of the titanium-containing zeolitic material having framework type MWW preferably comprising zinc and the silica binder, wherein the weight ratio of the titanium-containing zeolitic material having framework type MWW preferably comprising zinc relative to the silica binder, calculated as $SiO_2$, is in the range of from 7:3 to 9:1, said molding having a tortuosity parameter relative to water of at most 2.4, determined as described in Reference Example 4 herein. Preferably, at least 99.5 weight-%, preferably at least 99.9 weight-% of the molding consist of the titanium-containing zeolitic material having framework type MWW and the silica binder. Preferably, the weight ratio of the titanium-containing zeolitic material having framework type MWW preferably comprising zinc relative to the silica binder, calculated as $SiO_2$, is in the range of from 7.5:2.5 to 8.5:1.5, preferably in the range of from 7.75:2.25 to 8.25:1.75. Preferably, the tortuosity parameter relative to water is in the range of from 1 to 3. More preferably, the tortuosity parameter relative to water is in the range of from 1 to 2.5. Preferably, the pore volume is in the range of from 0.8 to 1.2 mL/g, preferably in the range of from 0.9 to 1.1 mL/g, as determined according to Reference Example 5 herein. Regarding preferred titanium-containing zeolites having framework type MWW, reference is made to the respective disclosure in the process section and the embodiment section hereinunder.

Therefore, the present invention preferably relates to a molding comprising a titanium-containing zeolitic material having framework type MWW comprising zinc and a silica binder, wherein the titanium zeolite having framework type MWW comprising zinc comprises titanium, calculated as elemental titanium, in an amount in the range of from 1 to 3 weight-%, based on the total weight of the titanium zeolite having framework type MWW comprising zinc, the titanium zeolite having framework type MWW comprises zinc, calculated as elemental zinc, in an amount in the range of from 1 to 3 weight-%, based on the total weight of the titanium zeolite having framework type MWW comprising zinc, wherein at least 99.5 weight-% of the titanium zeolite having framework type MWW comprising zinc consist of Zn, Ti, Si, O, and H, wherein at least 99.9 weight-% of the molding consist of the titanium-containing zeolitic material having framework type MWW comprising zinc and the silica binder, wherein the weight ratio of the titanium-containing zeolitic material having framework type MWW comprising zinc relative to the silica binder, calculated as $SiO_2$, is in the range of from 7.75:2.25 to 8.25:1.75, wherein the tortuosity parameter relative to water is in the range of from 1 to 2.5, and wherein the pore volume is in the range of from 0.9 to 1.1 mL/g.

The molding of the present invention can be employed for every conceivable use, for example as a molecular sieve, a catalyst, a catalyst precursor, a catalyst component, an adsorbent, an absorbent, and the like. Preferably, the molding is used as a catalyst precursor or a catalyst comprising the titanium-containing zeolitic material having framework type MWW preferably comprising zinc as catalytically active material. More preferably, the molding is used as a catalyst for the epoxidation of an olefin, preferably propene. Therefore, the present invention also relates to a process for preparing an olefin epoxide, preferably propene oxide, comprising subjecting the olefin to epoxidation conditions in the presence of the molding described hereinabove as the epoxidation catalyst.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing a composition, preferably an extrudable composition, said composition comprising a titanium-containing zeolitic material having framework type MWW, the process comprising
   (i) providing a titanium-containing zeolitic material having framework type MWW, having a water absorption capacity of at least 11 weight-% as determined according to Reference Example 1 herein;
(ii) subjecting the titanium-containing zeolitic material having framework type MWW provided in (i) to an acid treatment, comprising
   (ii.1) preparing an aqueous suspension comprising an aqueous liquid phase and the titanium-containing zeolitic material having framework type MWW provided in (i), wherein the aqueous liquid phase comprises water and an acid;
   (ii.2) heating the aqueous suspension according to (ii.1);
   (ii.3) separating the acid-treated titanium-containing zeolitic material having framework type MWW from the liquid phase of the aqueous suspension according to (ii.2);
(iii) optionally incorporating zinc in the acid-treated titanium-containing zeolitic material having framework type MWW according to (ii);
(iv) preparing a composition comprising the titanium-containing zeolitic material having framework type MWW obtained from (ii) or (iii), a precursor of a silica binder, water, and a kneading agent, wherein the composition does not comprise a polyethylene oxide.

2. The process of embodiment 1, wherein the titanium-containing zeolitic material having framework type MWW provided in (i) has a water absorption capacity in the range of from 11 to 20 weight-%, preferably in the range of from 11.5 to 18, more preferably in the range of from 12 to 16 weight-%.

3. The process of embodiment 1 or 2, wherein at least 99 weight-%, preferably at least 99.5 weight-% of the zeolitic framework of the titanium-containing zeolitic material having framework type MWW provided in (i) consist of Ti, Si, O, and H.

4. The process of any one of embodiments 1 to 3, wherein the titanium-containing zeolitic material having framework type MWW provided in (i) comprises titanium, calculated as elemental titanium, in an amount in the range of from 0.1 to 5 weight-%, preferably in the range of from 0.5 to 4 weight-%, more preferably in the range of from 1 to 3 weight-%, based on the total weight of the titanium-containing zeolitic material having framework type MWW.

5. The process of any one of embodiments 1 to 4, wherein the titanium-containing zeolitic material having framework type MWW provided in (i) is a calcined titanium-containing zeolitic material having framework type MWW.

6. The process of any one of embodiments 1 to 5, wherein the titanium-containing zeolitic material having framework type MWW comprises, preferably consists of particles exhibiting a particle size distribution characterized by a Dv10 value in the range of from 1 to 5 micrometer, preferably in the range of from 2 to 4 micrometer, a Dv50 value in the range of from 7 to 15 micrometer, preferably in the range of from 8 to 12 micrometer, and a Dv90 value in the range of from 20 to 40 micrometer, preferably in the range of from 25 to 35 micrometer, as determined according to Reference Example 7 herein.

7. The process of any one of embodiments 1 to 6, wherein in the aqueous suspension prepared in (ii.1), the weight ratio of the aqueous liquid phase relative to the titanium-containing zeolitic material having framework type MWW is in the range of from 10:1 to 30:1, preferably in the range of from 15:1 to 25:1, more preferably in the range of from 18:1 to 22:1.

8. The process of any one of embodiments 1 to 7, wherein the acid comprised in the aqueous liquid phase comprises, preferably is, is one or more inorganic acids, preferably one or more of phosphoric acid, sulphuric acid, hydrochloric acid, and nitric acid, wherein more preferably, the acid comprises, preferably is, sulphuric acid or nitric acid.

9. The process of any one of embodiments 1 to 8, wherein at least 99 weight-%, preferably at least 99.5 weight-%, more preferably at least 99.9 weight-% of the aqueous liquid phase according to (ii.1) consist of water and the acid.

10. The process of any one of embodiments 1 to 9, wherein the aqueous liquid phase according to (ii.1) has a pH in the range of from 0 to 5, preferably in the range of from 0 to 3, more preferably in the range of from 0 to 2, determined as described in Reference Example 2 herein.

11. The process of any one of embodiments 1 to 10, wherein at least 99 weight-%, preferably at least 99.5 weight-%, more preferably at least 99.9 weight-% of the aqueous suspension prepared in (ii.1) consist if the aqueous liquid phase and the titanium-containing zeolitic material having framework type MWW.

12. The process of any one of embodiments 1 to 11, wherein in (ii.2), the aqueous suspension according to (ii.1) is heated to a temperature of the suspension in the range of from 50 to 175° C., preferably in the range of from 70 to 125° C., more preferably in the range of from 90 to 105° C.

13. The process of embodiment 12, wherein in (ii.2), the aqueous suspension is kept at said temperature for 0.1 to 24 h, preferably for 0.3 to 6 h, more preferably for 0.5 to 1.5 h.

14. The process of any one of embodiments 1 to 13, wherein the heating according to (ii.2) is carried out in a closed system under autogenous pressure, preferably in an autoclave.

15. The process of any one of embodiments 1 to 14, wherein in (ii.3), the separating of the acid-treated titanium-containing zeolitic material having framework type MWW from the liquid phase of the aqueous suspension according to (ii.2) includes one or more of filtrating and centrifuging.

16. The process of embodiment 15, wherein the separating of the acid-treated titanium-containing zeolitic material having framework type MWW from the liquid phase of the aqueous suspension according to (ii.2) further includes drying the acid-treated titanium-containing zeolitic material having framework type MWW.

17. The process of embodiment 16, wherein the acid-treated titanium-containing zeolitic material having framework type MWW is dried in a gas atmosphere at a temperature of the gas atmosphere in the range of from 100 to 250° C., preferably in the range of from 110 to 200° C., more preferably in the range of from 120 to 160° C.

18. The process of any one of embodiments 1 to 17, wherein in (ii.3), the separating of the acid-treated titanium-containing zeolitic material having framework type MWW from the liquid phase of the aqueous suspension according to (ii.2) includes one or more of spray-drying, flash-drying, and microwave drying.

19. The process of any one of embodiments 1 to 18, preferably of any one of embodiments 16 to 18, wherein in (ii.3), the separating of the acid-treated titanium-containing zeolitic material having framework type MWW from the liquid phase of the aqueous suspension according to (ii.2) further comprises calcining the acid-treated titanium-containing zeolitic material having framework type MWW, preferably the dried acid-treated titanium-containing zeolitic material having framework type MWW.

20. The process of embodiment 19, wherein the acid-treated titanium-containing zeolitic material having framework type MWW is calcined in a gas atmosphere at a temperature of the gas atmosphere in the range of from 400 to 800° C., preferably in the range of from 500 to 750° C., more preferably in the range of from 600 to 700° C.

21. The process of any one of embodiments 1 to 20, comprising
 (iii) incorporating zinc in the acid-treated titanium-containing zeolitic material having framework type MWW according to (ii);
 (iv) preparing a composition comprising the titanium-containing zeolitic material having framework type MWW obtained from (iii), a precursor of a silica binder, water, and a kneading agent, wherein the composition does not comprise a polyethylene oxide.

22. The process of embodiment 21, wherein in (iii), the incorporating of zinc comprises an impregnation, preferably a wet impregnation, of the acid-treated titanium-containing zeolitic material having framework type MWW.

23. The process of embodiment 21 or 22, wherein in (iii), the incorporating of zinc comprises
 (iii.1) preparing an aqueous suspension comprising an aqueous liquid phase and the acid-treated titanium-containing zeolitic material having framework type MWW, wherein the aqueous liquid phase comprises water and a dissolved zinc salt;
 (iii.2) heating the aqueous suspension according to (iii.1);
 (iii.3) separating the acid-treated titanium-containing zeolitic material having framework type MWW and comprising zinc from the liquid phase of the aqueous suspension according to (iii.2).

24. The process of embodiment 23, wherein in the aqueous suspension prepared in (iii.1), the weight ratio of the aqueous liquid phase relative to the acid-treated titanium-containing zeolitic material having framework type MWW is in the range of from 40:1 to 1:1, preferably in the range of from 35:1 to 5:1, more preferably in the range of from 15:1 to 6:1.

25. The process of embodiment 23 or 24, wherein the zinc salt comprises, preferably is, zinc acetate, preferably zinc acetate dihydrate.

26. The process of any one of embodiments 23 to 25, wherein in the aqueous suspension according to (iii.1), the weight ratio of the dissolved zinc salt, calculated as elemental zinc, relative to the acid-treated titanium-containing zeolitic material having framework type MWW is in the range of from 0.01:1 to 0.2:1, preferably in the range of from 0.02:1 to 0.1:1, more preferably in the range of from 0.04:1 to 0.06:1.

27. The process of any one of embodiments 23 to 26, wherein at least 99 weight-%, preferably at least 99.5 weight-%, more preferably at least 99.9 weight-% of the aqueous liquid phase according to (iii.1) consist of water and the dissolved zinc salt.

28. The process of any one of embodiments 23 to 27, wherein at least 99 weight-%, preferably at least 99.5 weight-%, more preferably at least 99.9 weight-% of the aqueous suspension prepared in (iii.1) consist if the aqueous liquid phase and acid-treated the titanium-containing zeolitic material having framework type MWW.

29. The process of any one of embodiments 23 to 28, wherein in (iii.2), the aqueous suspension according to (iii.1) is heated to a temperature of the suspension in the range of from 65 to 135° C., preferably in the range of from 75 to 125° C., more preferably in the range of from 85 to 115° C.

30. The process of embodiment 29, wherein in (iii.2), the aqueous suspension is kept at said temperature for 0.2 to 10 h, preferably for 0.5 to 8 h, more preferably for 1 to 6 h.

31. The process of any one of embodiments 23 to 30, wherein in (iii.3), the separating of the acid-treated titanium-containing zeolitic material having framework type MWW and comprising zinc from the liquid phase of the aqueous suspension according to (iii.2) includes one or more of filtrating and centrifuging.

32. The process of embodiment 31, wherein the separating of the acid-treated titanium-containing zeolitic material having framework type MWW and comprising zinc from the liquid phase of the aqueous suspension according to (iii.2) further includes drying the acid-treated titanium-containing zeolitic material having framework type MWW and comprising zinc.

33. The process of embodiment 32, wherein the acid-treated titanium-containing zeolitic material having framework type MWW is dried at a gas atmosphere at a temperature of the gas atmosphere in the range of from 100 to 300° C., preferably in the range of from 150 to 275° C., more preferably in the range of from 200 to 250° C.

34. The process of any one of embodiments 23 to 30, wherein in (iii.3), the separating of the acid-treated titanium-containing zeolitic material having framework type MWW and comprising zinc from the liquid phase of the aqueous suspension according to (iii.2) includes one or more of spray-drying, flash-drying, and microwave drying.

35. The process of any one of embodiments 23 to 34, preferably of any one of embodiments 32 to 34, wherein in (iii.3), the separating of the acid-treated titanium-containing zeolitic material having framework type MWW and comprising zinc from the liquid phase of the aqueous suspension according to (iii.2) further comprises calcining the acid-treated titanium-containing zeolitic material having framework type MWW and comprising zinc, preferably the dried acid-treated titanium-containing zeolitic material having framework type MWW and comprising zinc.

36. The process of embodiment 35, wherein the acid-treated titanium-containing zeolitic material having framework type MWW and comprising zinc is calcined in a gas atmosphere at a temperature of the gas atmosphere in the range of from 500 to 725° C., preferably in the range of from 600 to 700° C., more preferably in the range of from 625 to 675° C.

37. The process any one of embodiments 1 to 36, wherein the kneading agent comprised in the composition according to (iv) comprises, preferably is, one or more hydrophilic polymer, more preferably comprises, more preferably is, one or more carbohydrates, more preferably comprises, more preferably is, one or more of a cellulose and a cellulose derivative, more preferably comprises, more preferably is, one or more of a cellulose, a cellulose ether and a cellulose ester.

38. The process of any one of embodiments 1 to 37, wherein the kneading agent comprised in the composition according to (iv) comprises, preferably is, a cellulose ether, preferably a cellulose alkyl ether, more preferably a methyl cellulose.

39. The process of any one of embodiments 1 to 38, wherein in the composition according to (iv), the weight ratio of the titanium-containing zeolitic material having framework type MWW relative to the kneading agent is in the range of from 5:1 to 20:1, preferably in the range of from 8:1 to 18:1, more preferably in the range of from 9:1 to 16:1.

40. The process of any one of embodiments 1 to 39, wherein the precursor of the silica binder comprised in the composition according to (iv) comprises, preferably is, one or more of a silica gel, a precipitated silica, a fumed silica, and a colloidal silica.

41. The process any one of embodiments 1 to 40, wherein the precursor of the silica binder comprised in the composition according to (iv) comprises, preferably is, a colloidal silica.

42. The process of any one of embodiments 1 to 41, wherein in the composition according to (iv), the weight ratio of the titanium-containing zeolitic material having framework type MWW relative to the precursor of the silica binder, calculated as $SiO_2$, is in the range of from 1:1 to 10:1, preferably in the range of from 3:1 to 7:1, more preferably in the range of from 3.5:1 to 4.5:1.

43. The process of any one of embodiments 1 to 42, wherein the composition according to (iv) does not comprise a polyalkylene oxide, preferably does not comprise one or more of a polyalkylene oxides, a polystyrene, a polyacrylate, a polymethacrylate, a polyolefin, a polyamide, and a polyester.

44. The process of any one of embodiments 1 to 43, wherein from 60 to 75 weight-%, preferably from 63 to 72 weight-%, more preferably from 65 to 70 weight-% of the composition according to (iv) consist of water.

45. The process of any one of embodiments 1 to 44, wherein at least 99 weight-%, preferably at least 99.5 weight-%, more preferably at least 99.9 weight-% of the composition according to (iv) consist of the titanium-containing zeolitic material having framework type MWW, the precursor of the silica binder, the water, and the kneading agent.

46. The process of any one of embodiments 1 to 45, wherein the composition according to (iv) has a plasticity of at most 1,500 N as determined according to Reference Example 3 herein.

47. The process of any one of embodiments 1 to 46, wherein the composition according to (iv) has a plasticity in the range of from 400 to 1,250 N.

48. The process of any one of embodiments 1 to 47, wherein the composition according to (iv) has a plasticity in the range of from 450 to 1,000 N.

49. The process of any one of embodiments 1 to 47, wherein the preparing of the composition according to (iv) comprises kneading the composition.

50. The process of any one of embodiments 1 to 49, further comprising (v) extruding the composition according to (iv), obtaining a molding.

51. The process of embodiment 50, being a process for preparing a molding comprising a titanium-containing zeolitic material having framework type MWW and a silica binder.

52. The process of embodiment 50 or 51, wherein from the extruding, a molding in the form of a strand is obtained.

53. The process of embodiment 52, wherein the strand has a diameter in the range of from 0.5 to 2.5 mm, preferably in the range of from 1 to 2 mm.

54. The process of any one of embodiments 50 to 53, further comprising (vi) drying the molding in a gas atmosphere.

55. The process of embodiment 54, wherein the molding is dried at a temperature of the gas atmosphere in the range of from 50 to 200° C., preferably in the range of from 75 to 175° C., more preferably in the range of from 100 to 150° C.

56. The process of any one of embodiments 50 to 55, preferably according to embodiment 54 or 55, further comprising
(vii) calcining the preferably dried molding in a gas atmosphere.

57. The process of embodiment 56, wherein the molding is calcined at a temperature of the gas atmosphere in the range of from 400 to 700° C., preferably in the range of from 450 to 650° C., more preferably in the range of from 500 to 600° C.

58. An extrudable composition, obtainable or obtained by a process according to any one of embodiments 1 to 48.

59. An extrudable composition, comprising a titanium-containing zeolitic material having framework type MWW, a precursor of a silica binder, water, and a kneading agent, wherein said composition does not comprise polyethylene oxide and wherein at least 99 weight-% of the composition consist of the titanium-containing zeolitic material having framework type MWW, the precursor of a silica binder, the water, and the kneading agent, said composition having a plasticity of at most 1,500 N as determined according to Reference Example 3 herein.

60. The extrudable composition of embodiment 59, having a plasticity in the range of from 400 to 1,250 N, preferably in the range of from 450 to 1,000 N.

61. The extrudable composition of embodiment 59 or 60, wherein the kneading agent comprised in the extrudable composition comprises, preferably is, one or more hydrophilic polymer, more preferably comprises, more preferably is, one or more carbohydrates, more preferably comprises, more preferably is, one or more of a cellulose and a cellulose derivative, more preferably comprises, more preferably is, one or more of a cellulose, a cellulose ether and a cellulose ester.

62. The extrudable composition of any one of embodiments 59 to 61, wherein the kneading agent comprised in the extrudable composition comprises, preferably is, a cellulose ether, preferably a cellulose alkyl ether, more preferably a methyl cellulose.

63. The extrudable composition of any one of embodiments 59 to 62, wherein in the extrudable composition, the weight ratio of the titanium-containing zeolitic material having framework type MWW relative to the kneading agent is in the range of from 5:1 to 20:1, preferably in the range of from 8:1 to 18:1, more preferably in the range of from 9:1 to 16:1.

64. The extrudable composition any one of embodiments 59 to 63, wherein the precursor of the silica binder comprised in the extrudable composition comprises, preferably is, one or more of a silica gel, a precipitated silica, a fumed silica, and a colloidal silica.
65. The extrudable composition any one of embodiments 59 to 64, wherein the precursor of the silica binder comprised in the composition comprises, preferably is, a colloidal silica.
66. The extrudable composition of any one of embodiments 59 to 65, wherein in the composition according to (iv), the weight ratio of the titanium-containing zeolitic material having framework type MWW relative to the precursor of the silica binder, calculated as $SiO_2$, is in the range of from 1:1 to 10:1, preferably in the range of from 3:1 to 7:1, more preferably in the range of from 3.5:1 to 4.5:1.
67. The extrudable composition of any one of embodiments 59 to 66, wherein the extrudable composition does not comprise a polyalkylene oxide, preferably does not comprise one or more of a polyalkylene oxides, a polystyrene, a polyacrylate, a polymethacrylate, a polyolefin, a polyamide, and a polyester.
68. The extrudable composition of any one of embodiment 59 to 67, wherein from 60 to 75 weight-%, preferably from 63 to 72 weight-%, more preferably from 65 to 70 weight-% of the extrudable composition consist of water.
69. The extrudable composition of any one of embodiments 59 to 68, wherein at least 99.5 weight-%, preferably at least 99.9 weight-% of the extrudable composition consist of the titanium-containing zeolitic material having framework type MWW, the precursor of the silica binder, the water, and the kneading agent.
70. The extrudable composition of any one of embodiments 59 to 69, wherein the titanium-containing zeolitic material having framework type MWW is an acid-treated titanium-containing zeolitic material having framework type MWW, said acid-treated titanium-containing zeolitic material having framework type MWW preferably being obtainable of obtained by a steps (i) and (ii) and optionally (iii) of a process according to any one of embodiments 1 to 36.
71. The extrudable composition of any one of embodiments 59 to 70, wherein the titanium zeolite having framework type MWW which is comprised in the extrudable composition comprises titanium, calculated as elemental titanium, in an amount in the range of from 0.1 to 5 weight-%, preferably in the range of from 1 to 3 weight-%, based on the total weight of the titanium zeolite having framework type MWW.
72. The extrudable composition of any one of embodiments 59 to 71, wherein the titanium zeolite having framework type MWW which is comprised in the extrudable composition comprises zinc, calculated as elemental zinc, in an amount in the range of from 0.1 to 5 weight-%, preferably in the range of from 1 to 3 weight-%, based on the total weight of the titanium zeolite having framework type MWW.
73. The extrudable composition of any one of embodiments 59 to 72, wherein at least 98 weight-%, preferably at least 99 weight-%, more preferably at least 99.5 weight-% of the titanium zeolite having framework type MWW which is comprised in the extrudable composition consist of Zn, Ti, Si, O, and H.
74. The extrudable composition of any one of embodiments 59 to 73, obtainable or obtained by a process according to any of embodiments 1 to 49.
75. Use of an extrudable composition according to any one of embodiments 58 to 74 for the preparation of a catalyst precursor or a catalyst comprising the titanium-containing zeolitic material having framework type MWW as catalytically active material, said catalyst preferably being a catalyst for the epoxidation of an olefin, preferably propene.
76. A method for preparing a catalyst precursor or a catalyst comprising a titanium-containing zeolitic material having framework type MWW as catalytically active material, said catalyst preferably being a catalyst for the epoxidation of an olefin, preferably propene, wherein the extrudable composition according to any one of embodiments 58 to 73 is used as starting material.
77. A molding, obtainable or obtained by a process according to any one of embodiments 50 to 57, preferably according to any one of embodiments 54 to 57, more preferably according to embodiment 56 or 57.
78. A molding comprising a titanium-containing zeolitic material having framework type MWW and a silica binder, wherein at least 99 weight-% of the molding consist of the titanium-containing zeolitic material having framework type MWW and the silica binder, wherein the weight ratio of the titanium-containing zeolitic material having framework type MWW relative to the silica binder, calculated as $SiO_2$, is in the range of from 7:3 to 9:1, said molding having a tortuosity parameter relative to water of at most 2.4, determined as described in Reference Example 4 herein.
79. The molding of embodiment 78, wherein at least 99.5 weight-%, preferably at least 99.9 weight-% of the molding consist of the titanium-containing zeolitic material having framework type MWW and the silica binder.
80. The molding of embodiment 78 or 79, wherein the weight ratio of the titanium-containing zeolitic material having framework type MWW relative to the silica binder, calculated as $SiO_2$, is in the range of from 7.5:2.5 to 8.5:1.5, preferably in the range of from 7.75:2.25 to 8.25:1.75.
81. The molding of any one of embodiments 78 to 80, having a tortuosity parameter relative to water in the range of from 1 to 3.
82. The molding of any one of embodiments 78 to 81, having a tortuosity parameter relative to water in the range of from 1 to 2.5.
83. The molding of any one of embodiments 78 to 82, having a pore volume in the range of from 0.8 to 1.2 mL/g, preferably in the range of from 0.9 to 1.1 mL/g, as determined according to Reference Example 5 herein.
84. The molding of any one of embodiments 78 to 83, wherein the titanium-containing zeolite having framework type MWW which is comprised in the molding comprises titanium, calculated as elemental titanium, in an amount in the range of from 0.1 to 5 weight-%, preferably in the range of from 1 to 3 weight-%, based on the total weight of the titanium zeolite having framework type MWW.
85. The molding of any one of embodiments 78 to 84, wherein the titanium-containing zeolite having framework type MWW which is comprised in the molding comprises zinc, calculated as elemental zinc, in an amount in the range of from 0.1 to 5 weight-%, preferably in the range of from 1 to 3 weight-%, based on the total weight of the titanium zeolite having framework type MWW.
86. The molding of any one of embodiments 78 to 85, wherein at least 98 weight-%, preferably at least 99 weight-%, more preferably at least 99.5 weight-% of the titanium-containing zeolite having framework type MWW which is comprised in the molding consist of Zn, Ti, Si, O, and H.
87. Use of a molding according to any one of embodiments 77 to 86 as a catalyst precursor or a catalyst comprising the titanium-containing zeolitic material having framework type MWW as catalytically active material, said catalyst preferably being a catalyst for the epoxidation of an olefin, preferably propene.
88. A method for preparing a catalyst comprising a titanium-containing zeolitic material having framework type MWW as catalytically active material, said catalyst preferably being a catalyst for the epoxidation of an olefin, preferably propene, wherein the molding according to any one of embodiments 77 to 86 is used as starting material.
89. A process for preparing an olefin epoxide, preferably propene oxide, comprising subjecting the olefin to epoxidation conditions in the presence of the molding according to any one of embodiments 77 to 86 as the epoxidation catalyst.
90. A process for preparing an olefin epoxide, preferably propene oxide, comprising preparing an epoxidation catalyst according to a process of any one of embodiments 50 to 57, preferably of any of embodiments 54 to 57, more preferably of embodiment 56 or 57, and subjecting the olefin to epoxidation conditions in the presence of said catalyst.

The present invention is further illustrated by the following reference examples, examples, and comparative examples.

EXAMPLES

Reference Example 1: Determination of the Water Adsorption Capacity

The water adsorption/desorption isotherms measurements were performed on a VTI SA instrument from TA Instruments following a step-isotherm program. The experiment consisted of a run or a series of runs performed on a sample material that has been placed on the microbalance pan inside of the instrument. Before the measurement was started, the residual moisture of the sample was removed by heating the sample to 100° C. (heating ramp of 5° C./min) and holding it for 6 h under a $N_2$ flow. After the drying program, the temperature in the cell was decreased to 25° C. and kept isothermal during the measurements. The microbalance was calibrated, and the weight of the dried sample was balanced (maximum mass deviation 0.01 weight-%). Water uptake by the sample was measured as the increase in weight over that of the dry sample. First, an adsorption curve was measured by increasing the relative humidity (RH) (expressed as weight-% water in the atmosphere inside of the cell) to which the samples was exposed and measuring the water uptake by the sample at equilibrium. The RH was increased with a step of 10% from 5% to 85% and at each step the system controlled the RH and monitored the sample weight until reaching the equilibrium conditions and recording the weight uptake. The total adsorbed water amount by the sample was taken after the sample was exposed to the 85% RH. During the desorption measurement the RH was decreased from 85% to 5% with a step of 10% and the change in the weight of the sample (water uptake) was monitored and recorded.

Reference Example 2: Determination of the pH

The pH was determined using a pH sensitive glass electrode.

Reference Example 3: Determination of the Plasticity

The plasticity as referred to in the context of the present invention is to be understood as determined via a table-top testing machine Z010/TN2S, supplier Zwick, D-89079 Ulm, Germany. As to fundamentals of this machine and its operation, reference is made to the respective instructions handbook "Betriebsanleitung der Material-Prüfmaschine", version 1.1, by Zwick Technische Dokumentation, August-Nagel-Strasse 11, D-89079 Ulm, Germany (1999). The Z010 testing machine was equipped with a fixed horizontal table on which a steel test vessel was positioned comprising a cylindrical compartment having an internal diameter of 26 mm and an internal height of 75 mm. This vessel was filled with the composition to be measured so that the mass filled in the vessel did not contain air inclusions. The filling level was 10 mm below the upper edge of the cylindrical compartment. Centered above the cylindrical compartment of the vessel containing the composition to be measured was a plunger having a spherical lower end, wherein the diameter of the sphere was 22.8 mm, and which was freely movable in vertical direction. Said plunger was mounted on the load cell of the testing machine having a maximum test load of 10 kN. During the measurement, the plunger was moved vertically downwards, thus plunging into the composition in the test vessel. Under testing conditions, the plunger was moved at a preliminary force (Vorkraft) of 1.0 N, a preliminary force rate (Vorkraftgeschwindigkeit) of 100 mm/min and a subsequent test rate (Prüfgeschwindigkeit) of 14 mm/min. A measurement was terminated when the measured force reached a value of less than 70% of the previously measured maximum force of this measurement. The experiment was controlled by means of a computer which registered and evaluated the results of the measurements. The maximum force (F_max in N) measured corresponds to the plasticity referred to in the context of the present invention.

Reference Example 4: Determination of the Tortuosity Parameter

The tortuosity parameter was determined as described in the experimental section of US 20070099299 A1. In particular, the NMR analyses to this effect were conducted at 25° C. and 1 bar at 125 MHz $^1H$ resonance frequency with the FEGRIS NT NMR spectrometer (cf. Stallmach et al. in Annual Reports on NMR Spectroscopy 2007, Vol. 61, pp. 51-131) at the Faculty for Physics and Geological Sciences of the University of Leipzig. The pulse program used for the PFG NMR self-diffusion analyses was the stimulated spin echo with pulsed field gradients according to FIG. 1b of US 20070099299 A1. For each sample, the spin echo attenuation curves were measured at up to seven different diffusion times ($\Delta/ms$=7, 10, 12, 25, 50, 75, 100) by stepwise increase in the intensity of the field gradients ($g_{max}$=10 T/m). From the spin echo attenuation curves, the time dependence of the self-diffusion coefficient of the pore water was determined by means of equations (5) and (6) of US 20070099299 A1. Calculation of the Tortuosity: Equation (7) of US 20070099299 A1 was used to calculate the time dependency of the mean quadratic shift $$\langle z^2(\Delta)\rangle = 1/3 \langle r^2(\Delta)\rangle$$

from the self-diffusion coefficients $D(\Delta)$ thus determined. By way of example, in FIG. 2 of US 20070099299 A1, the data is plotted for exemplary catalyst supports of said document in double logarithmic form together with the corresponding results for free water. FIG. 2 of US 20070099299 A1 also shows in each case the best fit straight line from the linear fitting of $$\langle r^2(\Delta)\rangle$$

as a function of the diffusion time $\Delta$. According to equation (7) of US 2007/0099299 A1, its slope corresponds precisely to the value $6\overline{D}$ where $\overline{D}$ corresponds to the self-diffusion coefficient averaged over the diffusion time interval. According to equation (3) of US 20070099299 A1, the tortuosity is then obtained from the ratio of the mean self-diffusion coefficient of the free solvent $(D_0)$ thus determined to the corresponding value of the mean self-diffusion coefficient in the molding.

Reference Example 5: Determination of the Pore Volume

The pore volume was determined by Hg intrusion porosimetry according to DIN 66133.

Reference Example 6: PO Test

In the PO test, the moldings of the present invention are tested as catalysts in a mini autoclave by reaction of propene with an aqueous hydrogen peroxide solution (30 weight-%) to yield propylene oxide. In particular, 0.63 g of the moldings of the invention were introduced together with 79.2 g of acetonitrile and 12.4 g of propene at room temperature, and 22.1 g of hydrogen peroxide (30 weight-% in water) were introduced in a steel autoclave. After a reaction time of 4 hours at 40° C., the mixture was cooled and depressurized, and the liquid phase was analyzed by gas chromatography with respect to its propylene oxide content. The propylene oxide content of the liquid phase (in weight-%) is the result of the PO test.

Reference Example 7: Particle Size Distribution 1.0 g of the zeolitic material to be subjected to measurement was suspended in 100 g deionized water and stirred about 10 min. The measurement of the particle size distribution was carried out in the liquid phase using a Mastersizer S long bed version 2.15, ser. No. 33544-325; supplier: Malvern Instruments GmbH, Herrenberg, Germany, using the following apparatus parameters:
 focal width: 300 RF mm
 beam length: 10.00 mm
 module: MS17
 shadowing: 16.9%
 dispersion model: 3$$D
 analysis model: polydisperse
 correction: none
The term "Dv10 value" as referred to in the context of the present invention describes the average particle size where 10 volume-% of the particles of the micropowder have a smaller size. Similarly, the term "Dv50 value" as referred to in the context of the present invention describes the average particle size where 50 volume-% of the particles of the micropowder have a smaller size, and the term "Dv90 value" as referred to in the context of the present invention describes the average particle size where 90 volume-% of the particles of the micropowder have a smaller size.

Reference Example 8: Crystallinity

The crystallinity of a zeolitic material referred to in the context of the present application was determined according to the method as described in the User Manual DIFFRAC.EVA Version 3, page 105, from Bruker AXS GmbH, Karlsruhe (published February 2003). The respective data were collected on a standard Bruker D8 Advance Diffractometer Series II using a LYNXEYE detector, from 2° to 50° 2theta, using fixed slits, a step size of 0.02° 2theta and a scan speed of 2.4 s/step. The parameters used for estimating the background/amorphous content were Curvature=0 and Threshold=0.8.

Reference Example 9: Providing a Titanium-Containing Zeolitic Material Having Framework Type MWW, Having a Water Absorption Capacity of at Least 11 Weight-%

(i) B—Ti-MWW Synthesis
The synthesis mixture had the following composition: 1.0 $(SiO_2):0.04\ (TiO_2):0.67\ (B_2O_3):1.4$ piperidine:19 $H_2O$.
Batch 0: 1,026 g of deionized water were initially introduced into a beaker, 365 g of piperidine were then added with stirring at 200 rpm, and the mixture was stirred for 10 min at pH 13.2 at about 23° C. Thereafter, the batch was divided into two equal parts.
Batch 1: 695.5 g of the deionized water-piperidine solution were placed in a beaker and, with stirring at 200 rpm, 248.4 g of boric acid were added and stirring was continued for 30 min, then 90 g of fumed silica (Cab-O-SIL® 5M) was added at about 23° C. The mixture was then stirred for 1 h at pH 11.4 at about 23° C.
Batch 2: 695.5 g of the deionized water-piperidine solution were initially introduced into a beaker, with stirring at 200 rpm at about 23° C., 43.2 g of tetrabutyl orthotitanate were added and stirring was continued for a further 30 minutes and then 90 g of fumed silica (Cab-O-SIL® 5M) were added. The mixture was then stirred for 1 h at pH 12.2 at about 23° C.
Batch 3: The two suspensions from batch 1 and 2 were mixed together for 1.5 h at pH 11.8 at about 23° C. to obtain the synthesis mixture and then crystallization was carried out in an autoclave under the following conditions:
Heating in 1 h to 130° C./keeping for 24 h at 100 rpm at a pressure of from 0-2.7 bar, then, heating in 1 h to 150° C./keeping for 24 h at 100 rpm at a pressure of from 2.7-4.9 bar, then, heating in 1 h to 170° C./keeping for 120 h at 100 rpm at a pressure of from 4.9-9.4 bar.
After the above crystallization conditions, the thus obtained suspension having a pH of 11.3 was drained and filtered through a suction filter (giving a clear filtrate) and washed with 10 liters of deionized water (giving a turbid filtrate). The turbid filtrate was then acidified to pH 7 with 10% aqueous $HNO_3$. Subsequently, the moist product (filter cake) was filled into a porcelain dish, dried overnight, then ground. The yield was 192.8 g. According to the elemental analysis the resulting product had the following contents determined per 100 g substance of 9.6 g carbon, 0.85 g B, 21.8 g Si and 17.8 g Ti.

(ii) B—Ti-MWW HNO₃ Treatment

The dried and ground material obtained according to item (i) above was washed with HNO₃ solution (ratio of solid to liquid 1 g:20 ml) for 20 h at 100° C.: In a 10 liter glass flask 3600 g HNO₃ solution and 180 g B—Ti-MWW according to item (i) were added at 100° C., followed by boiling for 20 hours at reflux with stirring at 250 rpm. The thus obtained white suspension was filtered off and washed with 2×5 liters of deionized water. Drying: 10 h/120° C. Calcination: heating at 2 K/min to 530° C./keeping for 5 h. The yield was 143 g. According to the elemental analysis the resulting product had the following contents determined per 100 g substance: <0.1 g carbon (TOC), 0.27 g B, 42 g Si, and 2 g Ti. The BET surface area was determined to be 532 m²/g. The crystallinity of the product was measured (Reference Example 8) to be 80% and the average crystal size as calculated from the XRD diffraction data was determined to be 22 nm.

(iii) B—Ti-MWW HNO₃ Treatment

The material obtained according to item (ii) above was washed with HNO₃ solution (ratio of solid to liquid 1 g: 20 ml) for 20 h at 100° C. In a 10 liter glass flask, 2,400 g of HNO₃ solution and 120 g of B—Ti-MWW according to item (ii) were added at 100° C., followed by boiling for 20 hours at reflux with stirring at 250 rpm. The white suspension was filtered off and washed with 7×1 liter of deionized water. Drying: 10 h/120° C. Calcination: heating at 2 K/min to 530° C./keeping for 5 h. The yield was 117 g. According to the elemental analysis the resulting product had the following contents determined per 100 g substance: <0.03 g B, 44 g Si, and 1.8 g Ti. The BET specific surface area was determined to be 501 m²/g. The crystallinity of the product was measured to be 94% and the average crystal size as calculated from the XRD diffraction data was determined to be 22 nm. The XRD of the resulting product confirmed that the zeolitic material obtained had an MWW framework structure.

The water adsorption capacity as determined by Reference Example 1 herein was 13.2 weight-%.

Reference Example 10: Providing a Titanium-Containing Zeolitic Material Having Framework Type MWW, Having a Water Absorption Capacity of at Least 11 Weight-%

(i) B—Ti-MWW Synthesis

The synthesis mixture had the following composition: 1.0 (SiO₂):0.04 (TiO₂):0.67 (B₂O₃):1.4 piperidine:19 H₂O.

Batch 0: 1,026 g of deionized water were initially introduced into a beaker, 365 g of piperidine were added with stirring at 200 rpm, and the mixture was stirred for 10 min at pH 13.2 at about 23° C. Thereafter, the batch was divided into two equal parts.

Batch 1: 695.5 g of deionized water-piperidine solution were placed in a beaker and, with stirring at 200 rpm, 248.4 g of boric acid were added and stirring was continued for 30 minutes, then 90 g of fumed silica (Cab-O-SIL® 5M) were added at about 23° C. The mixture was then further stirred for 1 h at pH 11.4 at about 23° C.

Batch 2: 695.5 g of deionized water-piperidine solution were initially introduced into a beaker, with stirring at 200 rpm at about 23° C., 43.2 g of tetrabutyl orthotitanate were added and stirring was continued for a further 30 min and then 90 g of fumed silica (Cab-O-SIL® 5M) were added. The mixture was then further stirred for 1 h at pH 12.2 at about 23° C.

Batch 3: The two suspensions from batch 1 and 2 were mixed together for 1.5 h at a pH of 11.8 at about 23° C. to obtain the synthesis mixture and then crystallization was carried out in an autoclave under the following conditions: heating in 1 h to 170° C./keeping for 120 h at 120 rpm at a pressure of from 0-9.4 bar. After the above crystallization conditions, the thus obtained suspension having a pH of 11.3 was drained and filtered through a suction filter and washed with 10 L of deionized water. Subsequently, the moist product (filter cake) was filled into a porcelain dish, dried overnight, then ground. The yield was 194 g.

(ii) B—Ti-MWW HNO3 Treatment

The dried and ground material according to item (i) was then washed with HNO₃ solution (ratio of solid to liquid 1 g:20 ml) for 20 h at 100° C.: In a 10 liter glass flask 3,600 g aqueous HNO₃ solution and 180 g B—Ti-MWW according to item (i) were added at 100° C., followed by boiling for 20 h at reflux with stirring at 250 rpm. The thus obtained white suspension was filtered off and washed with 2×5 L of deionized water. Drying: 10 h/120° C. Calcination: heating at 2 K/min to 530° C./keeping for 5 h. The yield was 146 g. According to the elemental analysis the resulting product had the following contents determined per 100 g substance: <0.1 g carbon (TOC), 0.25 g B, 43 g Si and 2.6 g Ti. The BET specific surface area was determined to be 514 m²/g. The crystallinity of the product was measured to be 79% and the average crystal size as calculated from the XRD diffraction data was determined to be 22.5 nm. The XRD of the resulting product confirmed that the zeolitic material obtained had an MWW framework structure.

The water adsorption capacity as determined by Reference Example 1 herein was 17.3 weight-%.

Reference Example 11: Providing a Titanium-Containing Zeolitic Material Having Framework Type MWW, Having a Water Absorption Capacity of at Least 11 Weight-%

(i) B—Ti-MWW Synthesis

In order to prepare a synthesis mixture having the following composition: 1.0 B₂O₃/2.0 SiO₂/32.8 H₂O/2.43 piperidine, deionized water and boric acid were mixed together in a beaker at about 23° C., to which ammonium stabilized silica sol was added with further mixing at about 23° C. The thus obtained mixture was then transferred to an autoclave and piperidine was then added with further mixing. Crystallization was then carried out in the autoclave over 48 hours at 175° C. at autogenous pressure. Any excess piperidine was then flashed off. The resulting product was then filtered off as a solid, washed with deionized water and dried. Rotary calcination was then carried out at 650° C. for 2 hours.

(ii) Deboronation

A slurry of the thus obtained calcined product was then prepared with deionised water, such that the slurry had a solids content of 6.25 weight-%. The slurry was heated to 90.5° C. and then held at said temperature for 10 hours. The resulting (deboronated) product was then filtered off as a solid, washed with deionized water and dried.

(iii) Ti Insertion

A slurry was prepared with the deionized water and the deboronated product of item (ii) above, which was mixed at 23° C. Said slurry was then transferred to an autoclave, to which a tetra-n-butyl titanate/piperidine mixture was then added. The thus obtained mixture had the following composition: 0.035 TiO₂/1.0 SiO₂/17.0 H₂O/1.0 Piperidine. Crystallization was then carried out in the autoclave over 48 hours at 170° C. under autogenous pressure. Any excess piperidine/ethanol was then flashed off. The resulting product was then filtered off as a solid, washed with deionized water and dried.

(iv) Acid Treatment

A slurry was prepared from the product according to item (iii) in 10% $HNO_3$ (aqueous) solution (907.2 g $HNO_3$/453.6 g product of item (iii), thus a 5 weight-% solids slurry was produced. The slurry was heated to 93.3° C. and then held at said temperature for 1 hour. The resulting product was then filtered off as a solid, washed with deionized water and dried. Rotary calcination was then carried out at 650° C. for 2 hours. According to the elemental analysis the resulting calcinated product had the following contents determined per 100 g substance of 2 g carbon (TOC), 42 g Si and 1.6 g Ti. The BET specific surface area was determined to be 420 $m^2$/g. The crystallinity of the product was measured to be 82%. The XRD of the resulting product confirmed that the zeolitic material obtained had an MWW framework structure. The water adsorption capacity as determined by Reference Example 1 herein was 14.1 weight-%.

Comparative Example 1: Preparing an Extrudable Composition and a Molding Starting from a Titanium-Containing Zeolitic Material Having Framework Type MWW Having a Water Absorption Capacity of Less Than 11 Weight-% a) A titanium-containing zeolitic material having framework type MWW was prepared as described in WO 2013/117536 A, in Examples 5.1 to 5.3, specifically 5.1 to 5.3 b). The respectively obtained titanium-containing zeolitic material having framework type MWW had a water absorption capacity, determined as described in Reference Example 1 herein, of 9.3 weight-%.

b) This titanium-containing zeolitic material having framework type MWW was then acid-treated as described in Example 5.3 c) of WO 2013/117536 A.

c) The respectively obtained acid-treated titanium-containing zeolitic material having framework type MWW was then further processed as described in Examples 5.3 d) and e) of WO 2013/117536 A.

d) From the respectively obtained calcined titanium-containing zeolitic material having framework type MWW, a zinc containing titanium-containing zeolitic material having framework type MWW was prepared as described in Example 5.4 of WO 2013/117536 A. The zinc containing titanium-containing zeolitic material having framework type MWW had a silicon content, calculated as elemental silicon, of 42.5 weight-%, a titanium content, calculated as elemental titanium, of 1.8 weight-% and a zinc content, calculated as elemental zinc, of 1.3 weight-%, each based on the total weight of the zinc containing titanium-containing zeolitic material having framework type MWW.

e) Based on this zinc containing titanium-containing zeolitic material having framework type MWW, an extrudable composition was prepared according to Example 5.5 of WO 2013/117536 A. In particular, for preparing the respective extrudable composition, no polyethylene oxide was employed. The respective components used for preparing the extrudable composition and the weight ratios according to which these components were employed are summarized in Table 1 hereinbelow. For kneading the composition, from which kneading the extrudable composition was obtained, the composition was mixed for a total time of 45 minutes in an edge mill at a speed of 32 r.p.m. (revolutions per minute). The extrudable composition obtained from the kneading in the koller was 1,550 N, determined as described in Reference Example 3 herein.

f) The thus obtained extrudable composition was extruded using an extruder. In said extruder, the composition was extruded at an absolute pressure in the range of from 65 to 80 bar for 15 to 20 min per batch. During extrusion, the composition in the extruder can be indirectly cooled using, for example, cooling water. The power consumption of the extruder was 2.4 A. A die head was employed allowing for producing cylindrical strands having a diameter of about 1.7 mm. At the die head out outlet, the strands were not subjected to a cutting to length. These strands were dried in air for 16 h at a temperature of 120° C. in a drying chamber and subsequently calcined in air for 1 h in a rotary furnace at a temperature of 550° C. Thereafter, the strands were sieved (mesh size 1.5 mm).

Comparative Example 2: Preparing a Composition Starting from a Titanium-Containing Zeolitic Material Having Framework Type MWW Having a Water Absorption Capacity of at Least 11 Weight-% Not Using PEO a) Provided was a calcined titanium-containing zeolitic material having framework type MWW. This zeolitic material was obtained from Zheijang TWRD New Material Co. Ltd., Lugu Avenue 335, Shuige Industry Development Zone, Lishui, Zhejiang, commercially available under ordering no. RST-01. This zeolitic material had a water adsorption capacity, determined as described in Reference Example 1 herein, of 14.1 weight-%. Further, the zeolitic material was characterized by a silicon content of 43 weight-%, calculated as elemental silicon, and a titanium content of 1.9 weight-%, calculated as elemental titanium, each based on the total weight of the zeolitic material. The zeolitic framework consisted of silicon, titanium, oxygen and hydrogen. Further, the zeolitic material was characterized by a BET specific surface area, determined via nitrogen adsorption at 77 K according to DIN 66131, of 499 $m^2$/g and a crystallinity, determined as described in Reference Example 8 hereinabove, of 77%. The zeolitic material had a particle size distribution determined as described in Reference Example 7 hereinabove, characterized by a Dv10 value of from 2.2 to 2.3 micrometer, a Dv50 value of from 9 to 10.8 micrometer and a Dv90 value of from 27.1 to 31.6 micrometer.

b) In this titanium-containing zeolitic material having framework type MWW, zinc was incorporated. In a vessel, a solution of 1,200 kg deionized water and 7.34 kg zing acetate dihydrate was prepared within 30 min. Under stirring at 40 r.p.m., 40 kg of the titanium-containing zeolitic material having framework type MWW provided in a) were suspended. Within 1 h, the suspension was heated to a temperature of 100° C. and kept at that temperature for 2 h under reflux at a stirring of 70 r.p.m. Thereafter, the suspension was cooled to at temperature of less than 50° C. The respectively cooled zinc containing titanium-containing zeolitic material having framework type MWW was separated from the suspension by filtration in a suction filter and filtrated at an absolute pressure of 2.5 bar under nitrogen. Then, the filter cake was washed with deionized water, and the washed filter cake was dried in a nitrogen stream at room temperature. Subsequently, it was calcined for 2 h at 650° C. under air in a rotary furnace. The zinc containing titanium-containing zeolitic material having framework type MWW had a silicon content, calculated as elemental silicon, of 41 weight-%, a titanium content, calculated as elemental titanium, of 2.5 weight-% and a zinc content, calculated as elemental zinc, of 1.7 weight-%, each based on the total weight of the zinc containing titanium-containing zeolitic material having framework type MWW a BET specific surface area, determined via nitrogen adsorption at 77 K according to DIN 66131, of 470 m$^2$/g and a crystallinity, as determined as described in Reference Example 8 hereinabove, of 84%.

c) Based on this zinc containing titanium-containing zeolitic material having framework type MWW, a composition was prepared as described in Comparative Example 1 e) hereinabove. In particular, for preparing the respective composition, no polyethylene oxide was employed. The respective components used for preparing the composition and the weight ratios according to which these components were employed are summarized in Table 1 hereinbelow. For kneading the composition, the composition was mixed in an edge mill in the same way as described in Comparative Example 1 e) hereinabove.

d) Then, it was tried to subject the mass obtained from c) to extrusion using the extrusion conditions as described in Comparative Example 1 f) above. It was found, however, that the high plasticity of the composition did not allow the extrusion of the composition. No strands could be obtained.

Comparative Example 3: Preparing an Extrudable Composition and a Molding Starting from a Titanium-Containing Zeolitic Material Having Framework Type MWW Having a Water Absorption Capacity of at Least 11 Weight-% Using PEO a) In the same way as described in Comparative Example 2 a) and b) above, a zinc containing titanium-containing zeolitic material having framework type MWW was prepared.

b) Based on this zinc containing titanium-containing zeolitic material having framework type MWW, a composition was prepared as described in Comparative Example 1 e) hereinabove. However, in contrast to Comparative Example 2 c) above, PEO (polyethylene oxide; Alkox® E-160 from Kowa) was additionally employed as component of the composition. The respective components used for preparing the composition and the weight ratios according to which these components were employed are summarized in Table 1 hereinbelow. For kneading the composition, the composition was mixed in a koller in the same way as described in Comparative Example 1 e) hereinabove.

c) The thus obtained composition was extruded using an extruder. In said extruder, the composition was extruded in the same way as described in Comparative Example 1 f) hereinabove. The obtained strands were dried and calcined in the same way as described in Comparative Example 1 f) hereinabove. Thereafter, the strands were sieved in the same way as described in Comparative Example 1 f) hereinabove.

Example 1: Preparing an Extrudable Composition and a Molding Starting from a Titanium-Containing Zeolitic Material Having Framework Type MWW Having a Water Absorption Capacity of at Least 11 Weight-% Not Using PEO a) Provided was a calcined titanium-containing zeolitic material having framework type MWW having a water absorption capacity, determined as described in Reference Example 1 herein, of 14.2 weight-%. This zeolitic material had essentially the same characteristics is the material provided according to Comparative Example 2 a) above. In particular, the zeolitic material was characterized by a silicon content of 42 weight-%, calculated as elemental silicon, and a titanium content of 2.4 weight-%, calculated as elemental titanium, each based on the total weight of the zeolitic material. The zeolitic framework consisted of silicon, titanium, oxygen and hydrogen. Further, the zeolitic material was characterized by a BET specific surface area of 568 m$^2$/g, determined via nitrogen adsorption at 77 K according to DIN 66131.

b) This titanium-containing zeolitic material having framework type MWW was then acid-treated as described in Example 5.3 c) of WO 2013/117536 A.

c) Based on this zeolitic material, a a zinc containing titanium-containing zeolitic material having framework type MWW was prepared, essentially in the same way as described in Comparative Example 2 b) above. The zinc containing titanium-containing zeolitic material having framework type MWW had a silicon content, calculated as elemental silicon, of 42 weight-%, a titanium content, calculated as elemental titanium, of 2.4 weight-% and a zinc content, calculated as elemental zinc, of 1.4 weight-%, each based on the total weight of the zinc containing titanium-containing zeolitic material having framework type MWW.

d) Based on this zinc containing titanium-containing zeolitic material having framework type MWW, a composition was prepared as described in Comparative Example 1 e) hereinabove. In particular, for preparing the respective composition, no polyethylene oxide was employed. The respective components used for preparing the composition and the weight ratios according to which these components were employed are summarized in Table 1 hereinbelow. For kneading the composition, the composition was mixed in a koller in the same way as described in Comparative Example 1 e) hereinabove.

e) The thus obtained extrudable composition was extruded using an extruder. In said extruder, the composition was extruded in the same way as described in Comparative Example 1 f) hereinabove. The obtained strands were dried and calcined in the same way as described in Comparative Example 1 f) hereinabove. Thereafter, the strands were sieved in the same way as described in Comparative Example 1 f) hereinabove.

Summary of Results

In the following Table 1, the components used for preparing the (extrudable) compositions according the Comparative Examples and the Example above, and their respective weight ratios are given.

TABLE 1

(Extrudable) Composition - components

| (Extrudable) Composition according to | Water absorption capacity of TiMWW[a]/ weight-% | Weight ratio PEO[b]/ ZnTiMWW | Weight ratio $H_2O$/ ZnTiMWW[c] | Weight ratio Walocel ®/ ZnTiMWW | Weight ratio[e] Ludox ® AS40/ ZnTiMWW |
|---|---|---|---|---|---|
| Comp. Ex. 1 | 9.3 | 0 | 1.9:1 | 1:15.5 | 1:4 |
| Comp. Ex. 2 | 14.1 | 0 | 1.9:1 | 1:15.5 | 1:4 |
| Comp. Ex. 3 | 14.1 | 1:106 | 2.0:1 | 1:15.5 | 1:4 |
| Ex. 1 | 14.2 | 0 | 2.2:1 | 1:15.6 | 1:4 |

[a] non acid-treated titanium-containing zeolitic material having framework type MWW
[b] polyethylene oxide
[c] zinc containing titanium-containing zeolitic material having framework type MWW
[d] Walocel MW 15000 GB, Wolff Cellulosics GmbH & Co. KG, Germany
[e] calculated as $SiO_2$ contained in the colloidal silica Ludox ® AS40

In the following Table 2, it is shown which influence the water absorption capacity and the acid treatment have on the plasticity of the formed composition:

TABLE 2

(Extrudable) Composition - characterization

| (Extrudable) Composition according to | Water absorption capacity of TiMWW[a]/ weight-% | Acid treatment (no/yes) | Use of PEO[b] (no/yes) | Plasticity of extrudable mass/N | Extrudable (no/yes) |
|---|---|---|---|---|---|
| Comp. Ex. 1 | 9.3 | yes | no | 1,550 | yes |
| Comp. Ex. 2 | 14.1 | no | no | 1,900 | no |
| Comp. Ex. 3 | 14.1 | no | yes | 1,287 | yes |
| Ex. 1 | 14.2 | yes | no | 490 | yes |

[a] non acid-treated titanium-containing zeolitic material having framework type MWW
[b] polyethylene oxide It was found according to Comparative Example 1 that for a titanium-containing zeolitic material used as starting material and having framework type MWW which has a water absorption capacity of 9.3 weight-% and, thus, less than 11 weight-%, it was possible to prepare a composition which had only a very limited number of different components, in particular which did not contain polyethylene oxide, and which had a plasticity of 1,550 N, which plasticity in turn allowed for extruding the respective composition although polyethylene oxide as plasticizing agent was not contained in the composition. Nevertheless, the plasticity of 1,550 N was comparatively high. Starting from a titanium-containing zeolitic material having a water absorption capacity of 14.1 weight-% and, thus, at least 11 weight-%, it was then found, as shown in Comparative Example 2, that if the acid treatment of the titanium-containing zeolitic material was not carried out, an advantageous composition comprising only a very limited number of different components, in particular which did not contain polyethylene oxide, the plasticity of the respectively obtained composition was too high, and the extrusion of this composition was not possible. Comparative Example 3 shows that starting from a titanium-containing zeolitic material having a water absorption capacity of 14.1 weight-% and, thus, at least 11 weight-%, for preparing a composition which can be extruded is possible under otherwise unchanged conditions if polyethylene oxide is added as an additional component in the extrudable composition, leading to a decrease in plasticity from 1,900 to 1,287 N. However, in particular in terms of the most preferred use of the respectively obtained moldings such as strands as a catalyst or a catalyst precursor, it is generally necessary to remove such additional component from the molding usually by calcination.

Surprisingly, it was found, as shown in Example 1 of the present invention, that combining the use of a starting material being a titanium-containing zeolitic material having a water absorption capacity at least 11 weight-%, for example 14.2 weight-% and the preparation of an extrudable composition having only a very limited number of different components, which composition, in particular, does not comprise polyethylene oxide, is possible if the said titanium-containing zeolitic material is acid treated. Yet further, it is shown by a comparison of Example 1 with both Comparative Example 1 and Comparative Example 3 that the acid treatment of a titanium-containing zeolitic material having a water absorption capacity of at least 11 weight-% leads to an extrudable composition which has by far the lowest plasticity of 490 N. The results of the present invention in terms of the finally obtained moldings are shown in Table 3 as follows:

TABLE 3

Molding - characterization

| Molding according to | Tortuosity parameter | Pore volume/ mL/g | Average pore size/ Angstrom | PO test[b]/ % |
|---|---|---|---|---|
| Comp. Ex. 1 | 2.5 | 1.3 | 55 | 8.1 |
| Comp. Ex. 2[a] | — | — | — | — |
| Comp. Ex. 3 | 2.6 | 0.93 | 29 | 9.0 |
| Ex. 1 | 2.2 | 1.05 | 45 | 8.9 |

[a] No molding could be prepared
[b] See Reference Example 6 herein

Generally, and in particular for molding, a low tortuosity parameter is a good indication that said molding can be advantageously employed as a catalyst or a catalyst precursor. As shown in Table 3 above, the combination of (i) an acid treated titanium-containing zeolitic material having framework type MWW which, prior to the acid treatment, had a water absorption capacity of at least 11 weight-% and (ii) the preparation of an extrudable composition which does not comprise polyethylene oxide results in a molding which has very low tortuosity parameter. In particular, the tortuosity parameter of the molding of the present invention is lower than the respective parameter of a molding which was prepared based on a titanium-containing zeolitic material having framework type MWW having a water absorption capacity of less than 11 weight-%, although the titanium-containing zeolitic material having framework type MWW was acid treated and the extrudable composition did not comprise polyethylene oxide; and is lower than the respective parameter of a molding which was prepared based on a titanium-containing zeolitic material having framework type MWW having a water absorption capacity of at least 11 weight-%, wherein the plasticity of the extrudable composition had been adjusted by the addition of polyethylene oxide in order to render the composition extrudable.

CITED LITERATURE

US 20070099299 A1
WO 2013/117536 A1

The invention claimed is:

1. A process for preparing a composition comprising a titanium-containing zeolitic material having framework type MWW, the process comprising
  (i) providing a titanium-containing zeolitic material having framework type MWW, having a water absorption capacity in the range of from 12 to 18 weight % as determined according to Reference Example 1 herein wherein the titanium-containing zeolitic material having framework type MWW provided in (i) is a calcined titanium-containing zeolitic material having framework type MWW;
  (ii) subjecting the titanium-containing zeolitic material having framework type MWW provided in (i) to an acid treatment, comprising
    (ii.1) preparing an aqueous suspension comprising an aqueous liquid phase and the titanium-containing zeolitic material having framework type MWW provided in (i), wherein the aqueous liquid phase comprises water and an acid;
    (ii.2) heating the aqueous suspension according to (ii.1);
    (ii.3) separating the acid-treated titanium-containing zeolitic material having framework type MWW from the liquid phase of the aqueous suspension according to (ii.2);
  (iii) incorporating zinc in the acid-treated titanium-containing zeolitic material having framework type MWW according to (ii); and
  (iv) preparing a composition comprising the titanium-containing zeolitic material having framework type MWW obtained from (ii) or (iii), a precursor of a silica binder, water, and a kneading agent, wherein the composition does not comprise a polyethylene oxide.

2. The process of claim 1, wherein the titanium-containing zeolitic material having framework type MWW provided in (i) has a water absorption capacity in the range of from 12 to 16 weight %.

3. The process of claim 1, wherein the titanium-containing zeolitic material having framework type MWW provided in (i) comprises titanium, calculated as elemental titanium, in an amount of from 0.1 to 5 weight-%, based on a total weight of the titanium-containing zeolitic material having framework type MWW.

4. The process of claim 1, wherein the titanium-containing zeolitic material having framework type MWW provided in (i) comprises particles exhibiting a particle size distribution characterized by a Dv10 value in the range of from 1 to 5 micrometer, a Dv50 value in the range of from 7 to 15 micrometer, and a Dv90 value in the range of from 20 to 40 micrometer.

5. The process of claim 1, wherein the acid comprised in the aqueous liquid phase comprises one or more inorganic acids.

6. The process of claim 1, wherein in (ii.2), the aqueous suspension according to (ii.1) is heated to a temperature of the suspension in the range of from 50 to 175° C., dried in a gas atmosphere at a temperature of the gas atmosphere in the range of from 100 to 250° C., and calcined in a gas atmosphere at a temperature of the gas atmosphere in the range of from 400 to 800° C.

7. The process of claim 1, comprising
  (iii) incorporating zinc in the acid-treated titanium-containing zeolitic material having framework type MWW according to (ii); and
  (iv) preparing a composition comprising the titanium-containing zeolitic material having framework type MWW obtained from (iii), a precursor of a silica binder, water, and a kneading agent, wherein the composition does not comprise a polyethylene oxide.

8. The process of claim 1, wherein the kneading agent comprised in the composition according to (iv) comprises one or more hydrophilic polymer.

9. The process of claim 1, wherein the precursor of the silica binder comprised in the composition according to (iv) comprises one or more of a silica gel, a precipitated silica, a fumed silica, and a colloidal silica.

10. The process of claim 1, wherein the composition according to (iv) does not comprise a polyalkylene oxide.

11. The process of claim 1, wherein at least 99 weight-% of the composition according to (iv) consist of the titanium-containing zeolitic material having framework type MWW, the precursor of the silica binder, the water, and the kneading agent.

12. The process of claim 1, wherein the composition according to (iv) has a plasticity of at most 1,500 N.

13. The process of claim 1, being a process for preparing a molding comprising a titanium-containing zeolitic material having framework type MWW and a silica binder, the process further comprising
  (v) extruding the composition according to (iv), obtaining a molding;
  (vi) drying the molding in a gas atmosphere; and
  (vii) calcining the dried molding in a gas atmosphere.

14. A molding, obtained by the process according to claim 13.

15. An extrudable composition, obtained by the process according to claim 1.

16. An extrudable composition, comprising
  a titanium-containing zeolitic material having framework type MWW, a precursor of a silica binder,
water, and
a kneading agent,
wherein
said composition does not comprise polyethylene oxide,
at least 99 weight-% of the composition consist of the titanium-containing zeolitic material having framework type MWW, the precursor of a silica binder, the water, and the kneading agent, and
said composition has a plasticity of at most 1,500 N.

17. A catalyst precursor or a catalyst, comprising the extrudable composition of claim 16.

18. A molding, comprising
a titanium-containing zeolitic material having framework type MWW and
a silica binder,
wherein
at least 99 weight-% of the molding consist of the titanium-containing zeolitic material having framework type MWW and the silica binder,
a weight ratio of the titanium-containing zeolitic material having framework type MWW relative to the silica binder, calculated as $SiO_2$, is in the range of from 7:3 to 9:1, and said molding has a tortuosity parameter relative to water of at most 2.4.

19. A catalyst precursor or a catalyst, comprising the molding of claim 18.

* * * * *